United States Patent
Contreras et al.

(10) Patent No.: US 8,826,041 B1
(45) Date of Patent: Sep. 2, 2014

(54) IN-BAND DETECTION MECHANISM FOR DETECTING INTERMEDIATE LAYER IN A STORAGE I/O DRIVER STACK

(75) Inventors: Cesareo Contreras, Northbridge, MA (US); Atul Kabra, New Dehli (IN); Michael E. Bappe, Loveland, CO (US); Edith Epstein, Arlington, MA (US); Helen S. Raizen, Jamaica Plain, MA (US)

(73) Assignee: EMC Corporation, Hopkinton, MA (US)

( * ) Notice: Subject to any disclaimer, the term of this patent is extended or adjusted under 35 U.S.C. 154(b) by 766 days.

(21) Appl. No.: 13/076,010

(22) Filed: Mar. 30, 2011

(51) Int. Cl.
- *G06F 21/00* (2013.01)
- *G06F 21/78* (2013.01)
- *H04L 9/32* (2006.01)
- *G06F 21/70* (2013.01)

(52) U.S. Cl.
CPC ............... *G06F 21/70* (2013.01); *G06F 21/78* (2013.01); *H04L 9/3247* (2013.01)
USPC .......................................... 713/193; 713/176

(58) Field of Classification Search
CPC ......... G06F 21/70; G06F 21/72; G06F 21/10; G06F 2221/2107; G11B 20/00086; G11B 20/0021; H40L 9/3281; H04N 21/8358; H04N 1/32144
USPC .......... 713/176, 177, 178, 179, 180, 189, 193
See application file for complete search history.

(56) References Cited

U.S. PATENT DOCUMENTS

| | | |
|---|---|---|
| 6,889,309 B1 | 5/2005 | Oliveira et al. |
| 7,315,914 B1 | 1/2008 | Venkatanarayanan et al. |
| 7,469,313 B1 | 12/2008 | Venkatanarayanan et al. |
| 7,536,503 B1 | 5/2009 | Venkatanarayanan et al. |
| 7,590,811 B1 | 9/2009 | Contreras |
| 7,689,786 B1 | 3/2010 | Riordan et al. |
| 7,770,053 B1 | 8/2010 | Bappe et al. |
| 7,809,912 B1 | 10/2010 | Raizen et al. |
| 7,890,664 B1 | 2/2011 | Tao et al. |
| 7,904,681 B1 | 3/2011 | Bappe et al. |
| 7,937,481 B1 | 5/2011 | Sandstrom et al. |
| 7,957,398 B1 | 6/2011 | Yochai et al. |
| 7,962,567 B1 | 6/2011 | Sandstrom et al. |
| 8,140,821 B1 | 3/2012 | Raizen et al. |
| 8,156,306 B1 | 4/2012 | Raizen et al. |
| 8,166,314 B1 | 4/2012 | Raizen et al. |
| 8,190,784 B1 | 5/2012 | Raizen et al. |
| 8,204,980 B1 | 6/2012 | Sandstrom et al. |
| 8,261,068 B1 | 9/2012 | Raizen et al. |

(Continued)

*Primary Examiner* — Eleni Shiferaw
*Assistant Examiner* — Hilary Branske
(74) *Attorney, Agent, or Firm* — BainwoodHuang

(57) ABSTRACT

A system shares encryption-related metadata between layers of a storage I/O stack. Additionally, a detection mechanism ensures that certain layers within the storage I/O stack are present and cooperate with a particular protocol. Along these lines, functional components engage in an in-band communications protocol, such as a data encryption key (DEK) management protocol. The in-band communications protocol employs protocol commands and responses carried along the data path as contents of in-band transport messages and responses, such as special SCSI read commands and their responses. The protocol commands and responses include a handshake command and a handshake response used during an initial handshake operation. Each protocol command and response has a protocol signature field carrying one of distinct first and second signature values which are used to identify the presence of the protocol command or response in the transport messages and responses at different locations along the data path.

22 Claims, 11 Drawing Sheets

(56) References Cited

U.S. PATENT DOCUMENTS

| | | |
|---|---|---|
| 8,281,033 B1 | 10/2012 | Riordan et al. |
| 8,316,161 B1 | 11/2012 | Contreras et al. |
| 8,332,612 B1 | 12/2012 | Raizen et al. |
| 8,332,613 B1 | 12/2012 | Glade et al. |
| 8,412,858 B2 | 4/2013 | Contreras et al. |
| 8,416,954 B1 | 4/2013 | Raizen et al. |
| 8,438,315 B1 | 5/2013 | Tao et al. |
| 8,452,900 B2 | 5/2013 | Povaliaev et al. |
| 8,468,241 B1 | 6/2013 | Raizen et al. |
| 8,583,835 B1 * | 11/2013 | Kan .................................. 710/5 |
| 8,601,085 B1 | 12/2013 | Ives et al. |
| 8,705,538 B1 | 4/2014 | Yochai et al. |
| 2002/0112161 A1 * | 8/2002 | Thomas et al. ................ 713/176 |
| 2002/0143986 A1 * | 10/2002 | Hale et al. ..................... 709/238 |

* cited by examiner

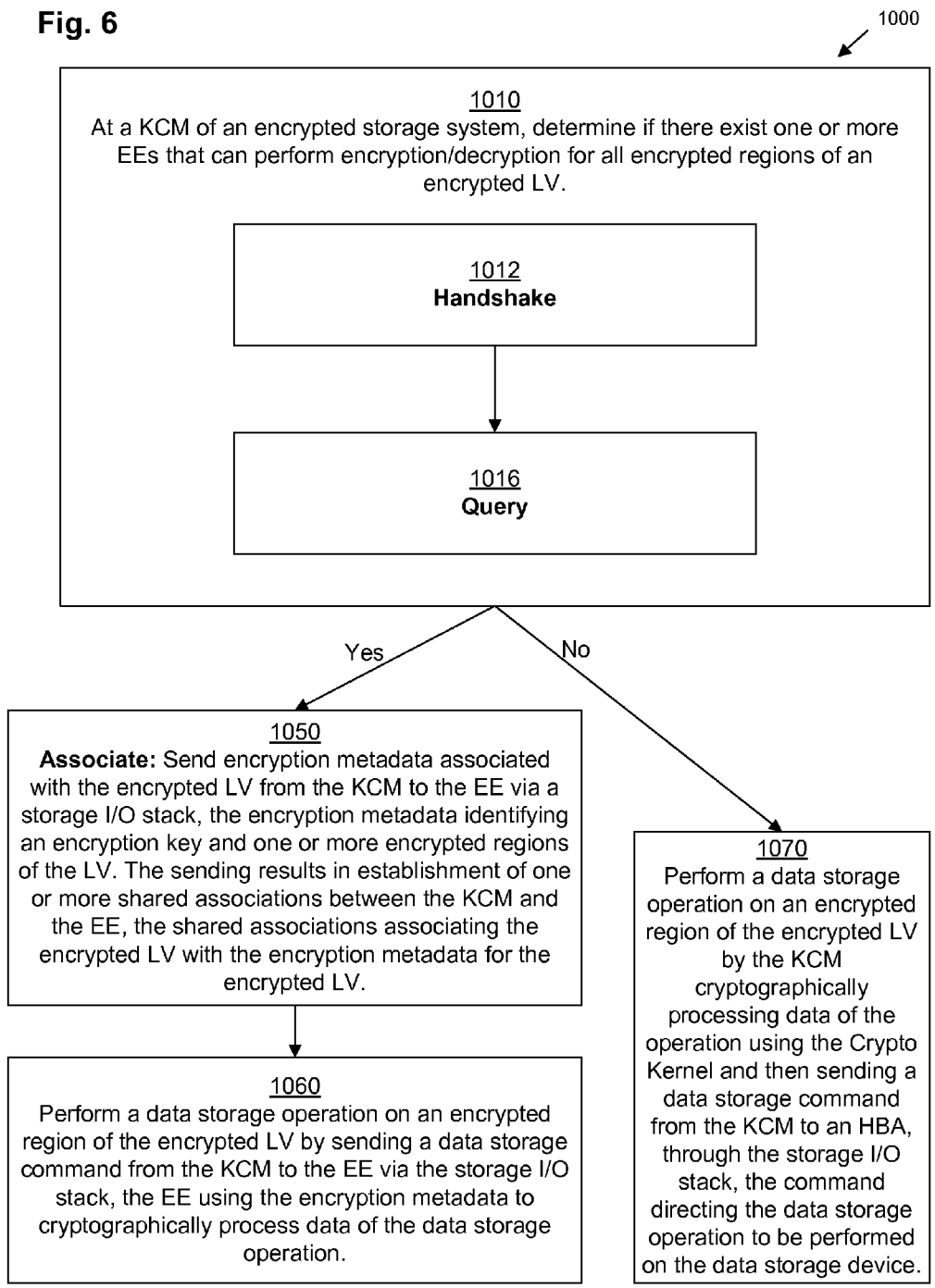

1210
Engage in an in-band communications protocol between first and second functional components, the in-band communications protocol employing protocol commands and responses carried along the data path as contents of in-band transport messages and responses. Protocol commands and responses include a handshake command and a handshake response used during an initial handshake operation, and each protocol command and response has a respective protocol signature field carrying one of distinct first and second signature values used to identify the presence of the protocol command or response in the transport messages and responses at different locations along the data path

1220
At the first functional component during the handshake operation, (1) include the first signature value in the protocol signature field of an outgoing handshake command being sent on the data path in a transport message, and (2) in response to receiving a transport response from the data path, confirm that the first signature value is found at an expected location of the protocol signature field as a condition to interpreting the contents of the transport response as an incoming handshake response

1230
At the second functional component during the handshake operation, (1) in response to receiving the transport message from the data path, confirm that the second signature value is found at an expected location of the protocol signature field as a condition to interpreting the contents of the transport message as an incoming handshake command, and (2) include the second signature value in the protocol signature field of an outgoing handshake response being sent on the data path in the transport response

1260
At the KCM, conclude that an encrypting HBA is present and the I/O stack is properly configured, and proceed to subsequent protocol operations for device

1270
At the KCM, conclude that either the I/O stack is improperly configured or there is no encrypting HBA, and do not proceed to subsequent protocol operations for device

IN-BAND DETECTION MECHANISM FOR DETECTING INTERMEDIATE LAYER IN A STORAGE I/O DRIVER STACK

BACKGROUND

In computer systems, it is sometimes desirable to encrypt some or all of the data stored in storage devices in the system. In some arrangements, data is encrypted in an I/O filter driver running on a host of the computer system. In some configurations, the I/O filter driver is configured to use a key securely provided by a network key server so that multiple hosts within a security domain can securely access the same data.

SUMMARY

The above-described approach to encryption in computer systems may not be entirely optimal, because encryption is a cycle-intensive task, so performing the encryption in a software filter driver on the host can cause slow performance. It may be desirable to offload data encryption tasks to specialized hardware-level component which operate under the control of supervisory software components. In other systems, there may be other system components that perform data encryption tasks under such supervision. In these kinds of systems it is necessary for such data encrypting components to obtain encryption "metadata", such as data encryption keys, for use in the data encryption operations.

Encryption-related metadata may be shared between layers of a storage I/O stack so that the metadata can be effectively transferred thereby to specialized hardware-level components or other encrypting components in a computer system. A host in an encrypted data storage system sends encryption metadata associated with an encrypted logical volume (LV) from a key controller module to an encryption endpoint via a storage I/O stack. The encryption metadata identifies an encryption key and encrypted regions of the LV, and the sending results in establishment of a shared association between the key controller module and the encryption endpoint which associates the encrypted LV with the encryption metadata for the encrypted LV. A data storage operation is performed on an encrypted region of the encrypted LV by sending a data storage command from the key controller module to the encryption endpoint via the storage I/O stack. The encryption endpoint uses the encryption metadata associated with the encrypted LV to cryptographically process data of the data storage operation.

However, the above approach may require that certain intermediate layers of the storage I/O stack are configured to properly transmit the encryption metadata. A detailed explanation of this kind of requirement is presented below. A technique is disclosed for detecting an intermediate driver or other functional component along a data path between a host computer and a storage device. In one embodiment the technique may be utilized entirely on the host computer, but it can also be used between the host computer and an external device that performs storage processing along the data path.

In the disclosed technique, first and second functional components engage in an in-band communications protocol, such as a data encryption key (DEK) management protocol used by a key controller module to configure an encryption endpoint. The in-band communications protocol employs protocol commands and responses carried along the data path as contents of in-band transport messages and responses, such as special SCSI Read commands and their responses (details explained below). The protocol commands and responses include a handshake command and a handshake response used during an initial handshake operation. Each protocol command and response has a protocol signature field carrying one of distinct first and second signature values which are used to identify the presence of the protocol command or response in the transport messages and responses at different locations along the data path.

During the handshake operation, the first functional component (1) includes the first signature value in the protocol signature field of an outgoing handshake command being sent on the data path in a transport message, and (2) in response to receiving a transport response from the data path, confirms that the first signature value is found at an expected location of the protocol signature field as a condition to interpreting the contents of the transport response as an incoming handshake response. The second functional component operates similarly but employs the distinct second signature value rather than the first. That is, the second functional component (1) in response to receiving the transport message from the data path, confirms that the second signature value is found at an expected location of the protocol signature field as a condition to interpreting the contents of the transport message as an incoming handshake command, and (2) includes the second signature value in the protocol signature field of an outgoing handshake response being sent on the data path in the transport response.

The above mechanism requires the presence of an intermediate functional component that substitutes the second signature value for the first signature value in the handshake command as it moves from the first to the second functional component, and that makes the reverse substitution in the handshake response. If such an intermediate functional component is present, then the handshake operation is successful and subsequent protocol operations can proceed. Otherwise the handshake is not successful and subsequent protocol operations do not proceed. Thus the technique is especially useful for confirming the presence of an intermediate functional component that is required for proper system operation, specific examples of which are described below in the context of encrypting data storage systems.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 6 depicts an example method according to one embodiment.

FIG. 9 depicts an example method according to one embodiment.

DETAILED DESCRIPTION

The general operation of a system for sharing encryption-related metadata between layers of a storage I/O stack is presented first below. Subsequently, in the section labeled "Confirming Configuration for Proper Operation," the detection mechanism is described for ensuring that certain layers within the storage I/O stack are present and cooperate with the protocol discussed herein.

Figure 1:
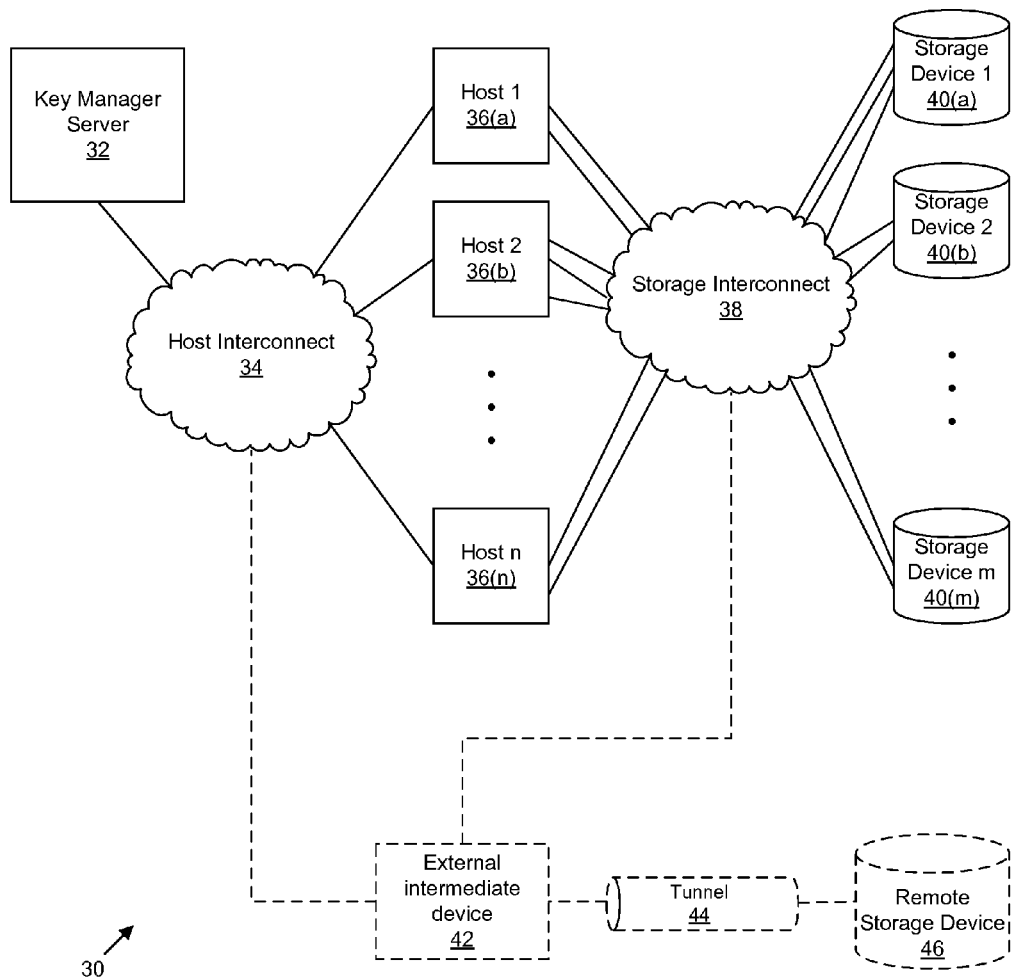
FIG. 1 depicts an example system for use in practicing various embodiments.

FIG. 1 depicts an example distributed computer system 30 (capable of performing as an encrypted data storage system) for use in performing various embodiments of the invention. System 30 includes a key manager server 32, a host interconnect 34, and one or more hosts 36 (depicted as hosts 36(a), 36(b), ..., 36(n)). Key manager server 32 and hosts 36 connect to each other via host interconnect 34. The hosts 36 also connect to storage devices 40 (depicted as storage devices 40(a), 40(b), ..., 40(m)) via a storage interconnect 38. In some embodiments, the host interconnect 34 and the storage interconnect 38 are combined. One or more external intermediate devices 42 may also attach to host interconnect 34 and storage interconnect 38. Certain types of external intermediate devices 42 may work in conjunction with a WAN tunnel 44 and one or more remote storage devices 46.

In operation, the hosts 36 execute application programs that utilize the storage devices 40 for non-volatile data storage. The storage interconnect 38 may employ a storage-oriented protocol such as iSCSI or Fibre Channel to enable block-oriented read and write commands and the accompanying data to be transferred between the hosts 36 and storage devices 40. Additionally, the system 30 provides selective encryption of storage data by the hosts 36 (and potentially the external intermediate device 42). The key manager server 32 and host interconnect 34 provide support for the data encryption function as described in more detail below.

Key manager server 32 provides key manager functionality, i.e., the generation, protection, storage, replacement, and elimination of data encryption keys and related data that are used in data encryption/decryption operations. In one embodiment, key manager server 32 is a server appliance. One example of a key manager server 32 usable in some embodiments is the RSA Key Manager appliance manufactured by EMC Corp. of Hopkinton, Mass. It should be understood that this is by way of example only; other products may also serve as the key manager server 32.

Key manager server 32 and hosts 36 connect to each other via host interconnect 34. Host interconnect 34 may be, for example, a network, such as a local area network (LAN) or a wide area network (WAN). Host interconnect 34 may also be realized by a collection of one or more switches interconnecting key manager server 32 and hosts 36.

Hosts 36 are computers executing applications that store data on the data storage devices 40. In addition to connecting to the host interconnect 34, each host 36 also connects to the storage interconnect 38, typically via a plurality of independent connections. In one embodiment, the hosts 36 employ a multipathing function which establishes and utilizes multiple paths from a given host 36 to a given storage device 40, which can provide higher performance as well as redundancy for greater availability. Further detail regarding hosts 36 is provided below in connection with FIGS. 2 and 3.

The storage interconnect 38 can be any type of network or input/output (I/O) bus capable of interconnecting storage devices 40 with host computers 36. In some embodiments, the storage devices 40 and host 36 are interconnected in a manner such that, to the operating systems running on the hosts 36, the storage devices 40 appear as locally attached, but this is not required for the invention. The storage interconnect 38 may be a shared, public, or private network and encompasses a wide area or local area and can be implemented through any suitable combination of wired and/or wireless communication networks. Furthermore, the storage interconnect 38 may include a LAN, a WAN, an intranet, the Internet, or a set of switches. For example, in one embodiment, the storage interconnect 38 works with Fibre Channel connectivity and is implemented in the form of a storage area network (SAN). In another embodiment, the storage interconnect 38 works with internet protocol (IP) connectivity and is implemented via an Internet-Small Computer System Interface (iSCSI) (e.g., for Fibre Channel). Those of skill in the art will recognize that other implementations are, of course, possible.

Storage devices 40 may be any sort of storage equipment capable of connecting to storage interconnect 38. In some embodiments, each storage device 40 is a disk array. As is well-known in the art, a typical disk array includes a disk array controller, disk enclosures holding a plurality of disk drives, and a power supply. A disk array may also include a cache. Examples of disk arrays include the Symmetrix Integrated Cache Disk Array System and the CLARiiON Disk Array System, both available from EMC Corp. of Hopkinton, Mass. In some embodiments, an external intermediate device 42 also attaches to host interconnect 34 and storage interconnect 38, for example, to provide a data de-duplication feature, or, in connection with WAN tunnel 44 and remote storage device 46, a remote replication feature.

As mentioned, key manager server 32 controls the generation, protection, storage, replacement, and elimination of data encryption keys. In particular, key manager server 32 creates encryption keys and corresponding key identifiers. Each key identifier, referred to as a key_id, is associated with a corresponding encryption key and can be used to obtain the key from the key manager server 32, provided that all permissions and credentials are in place.

Figure 2:
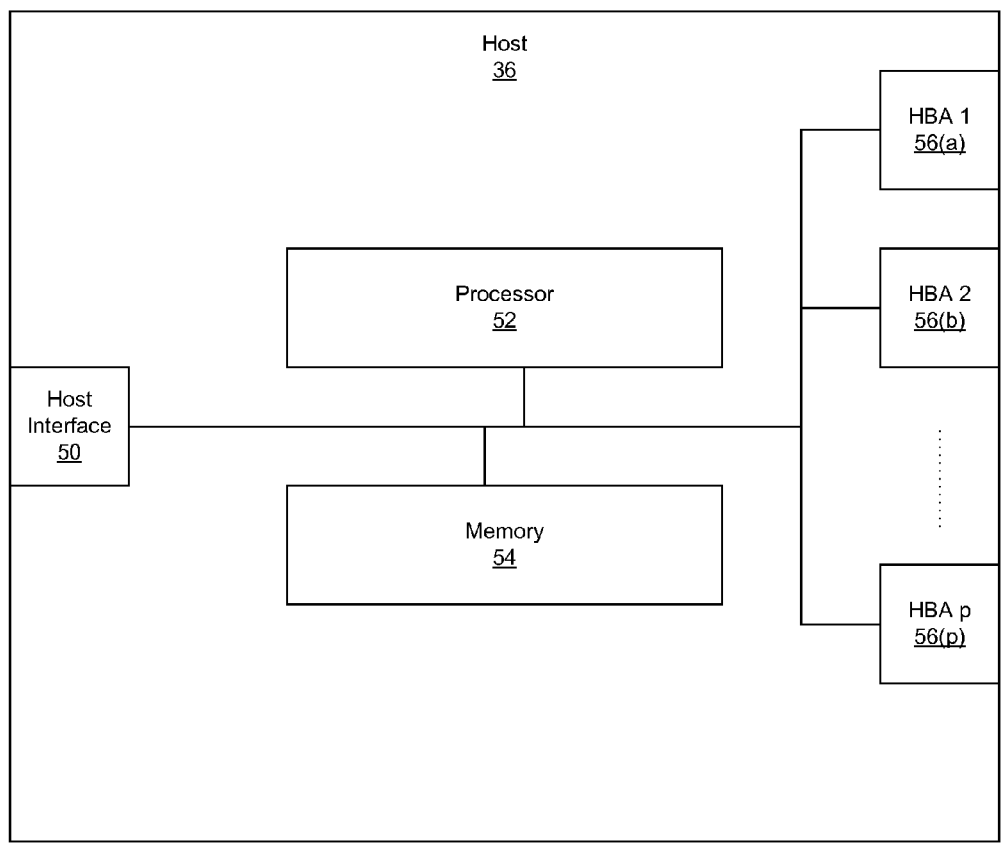
FIG. 2 depicts an example apparatus for use in practicing various embodiments.

FIG. 2 depicts a host 36 in greater detail. Each host 36 includes a host interface 50 for connecting to host interconnect 34, a processor 52, memory 54, and one or more host bus adapters (HBA) 56 (depicted as HBAs 56(a), 56(b), ..., 56(p)) for connecting to storage interconnect 38 over redundant paths. Processor 52 may be any sort of controller, such as, for example, a general purpose processor or microprocessor, a central processing unit, a set of multiple processing units, or a set of dedicated circuitry designed to perform particular operations in hardware. Memory 54 may be made up of one or more of the following: volatile random access memory, non-volatile read-only memory, non-volatile flash memory, magnetic storage, optical storage, etc. In some embodiments, one or more of the HBAs 56 are "encrypting" HBAs that perform encryption and decryption of storage data using dedicated hardware-level circuitry which is not shown in FIG. 2.

Figure 3:
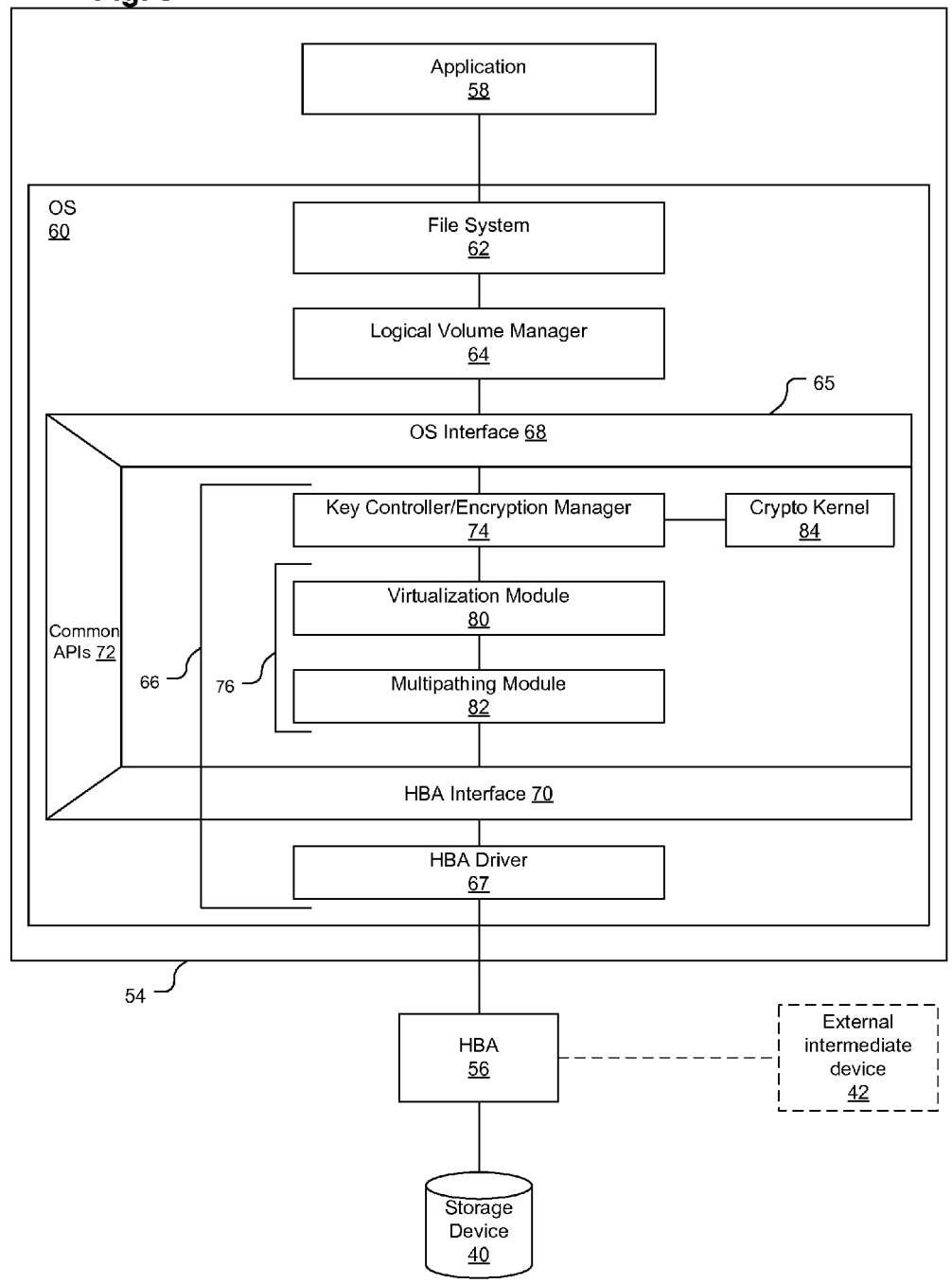
FIG. 3 depicts an example view of various functional components for use in practicing various embodiments.

FIG. 3 illustrates certain software that is contained within the memory 54 during system operation. As shown, in one embodiment, memory 54 stores one or more computer program applications 58 and an operating system (OS) 60. Applications 58 and OS 60 contain a set of instructions to be executed by processor 52. Memory 54 may also store application data.

OS 60 (which contains many well-known components that are not shown or described herein) includes a file system 62 and a logical volume manager 64. OS 60 also includes an input/output (I/O) filter driver 65 and an HBA driver 67. I/O filter driver 65 may be, for example, a component of the PowerPath Encryption With RSA software available from EMC Corp. of Hopkinton, Mass. I/O filter driver 65 includes an OS interface 68, an HBA interface 70, and a set of common application programming interfaces (APIs) 72. I/O filter driver 65 also includes a key controller module (KCM) or encryption manager 74 and one or more intermediate layers (IL) 76. ILs 76 may include, for example, one or more virtualization modules 80 and multipathing modules 82. Crypto kernel 84 may also be considered to be part of I/O filter driver 65. Portions of the I/O filter driver 65 and the HBA driver 67 may also make up storage I/O stack 66. It should be understood that this arrangement is by way of example only; in some embodiments, one or more components of the storage I/O stack 66 may be external to the I/O filter driver 65. In any case, for purposes of this description, the storage I/O stack 66 includes functional components between the KCM 74 and a software interface to the encryption endpoint (EE) where encryption is performed (e.g., HBA driver 67, or in some cases, a driver for external intermediate device 42).

The KCM 74 is generally responsible for managing the data encryption aspects of operation of the host 36 in which it resides. In some arrangements, the KCM 74 may arrange for the encryption to be performed by crypto kernel 84. However, since KCM 74 and crypto kernel 84 both run in software (running on processor 52), such operation may impose a performance penalty in terms of latency and/or throughput of data storage operations. Therefore, in some arrangements, KCM 74 is able to arrange for the encryption to be performed by hardware-level encrypting circuitry which may be located within one or more HBAs 56 as mentioned above. In many case, such encrypting circuitry will include a combination of hardware and firmware. An HBA 56 that includes such encrypting circuitry may be referred to as an encrypting HBA or "EHBA", while an HBA 56 that does not include such encrypting circuitry may be referred to as a non-encrypting HBA or "NHBA". The term "hardware-assisted encryption" is used to refer to encryption being performed using such encrypting circuitry.

Figure 4:
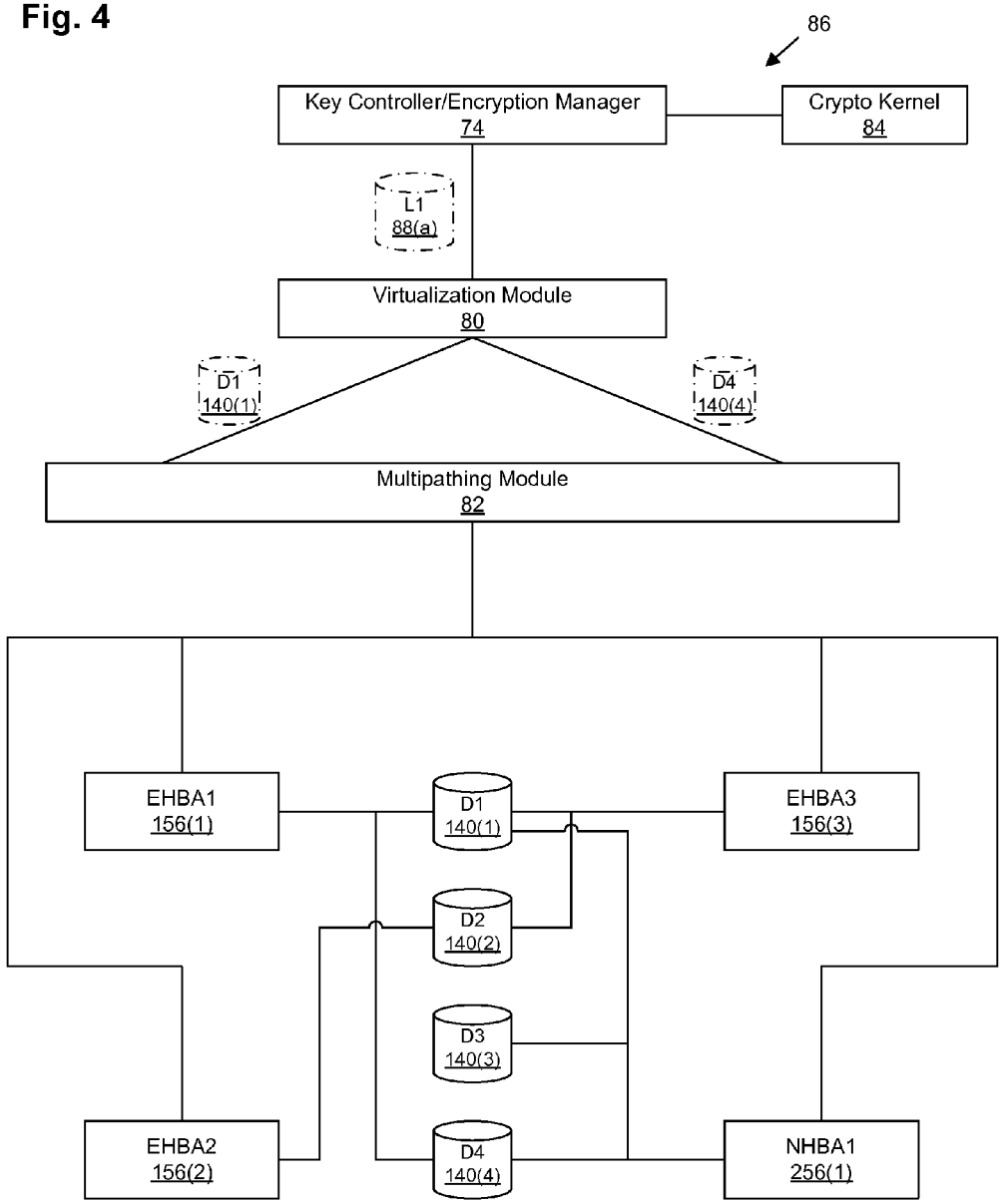
FIG. 4 depicts an example logical layout of a system for use in practicing various embodiments.

FIG. 4 depicts an example logical arrangement 86 of storage I/O stack 66 and other system elements according to one embodiment. In particular, FIG. 4 depicts functional connections within the storage I/O stack 66 and between the storage I/O stack 66 and certain disks of the storage devices 40 via respective HBAs 56. The disks 140(1)-140(4) are labeled D1-D4 respectively. The HBAs 56 are shown as EHBAs 156(1)-156(3) and an NHBA 256(1).

A logical disk L1 88(*a*) is defined by virtualization module 80. Virtualization module 80 provides a "virtualization" system function, presenting a logical unit of data (LU) as a logical disk or logical volume (LV) to KCM 74 and to the OS 60 via OS interface 68 even though the LV may not actually be a contiguous physical entity, which is assumed to result in assigning logical blocks of L1 to specific storage devices 40. This virtualization may be, for example, a mirroring, a striping, or some combination thereof. In arrangement 86, logical disk L1 88(*a*) is shown as being virtualized across two storage devices D1 140(1) and D4 140(4). It should be understood that throughout this description the term LU is used to refer to a logical unit of data at any level of abstraction (e.g., as seen by the KCM 74, as seen by one of the ILs 76, or as seen by an HBA 56), while the term LV is used to specifically refer to an LU as seen by the KCM 74.

A multipathing module 82 provides a multipathing system function by which multiple paths to these storage devices are established through the storage interconnect 38 and utilized in operation for greater parallelism, availability, and performance. As depicted, multipathing module 82 connects to EHBA1 156(1), EHBA2 156(2), EHBA3 156(3), and NHBA1 256(1) (via the HBA driver interface 70 and HBA driver 67 of FIG. 3), and the following paths exist:

To D1 140(1) via EHBA1 156(1), EHBA3 156(3), and NHBA1 256(1)

To D2 140(2) via EHBA2 156(2) and EHBA3 156(3)

To D3 140(3) via NHBA1 256(1)

To D4 140(4) via EHBA1 156(1) and NHBA1 256(1).

It should be noted that FIG. 4 presents a simplified example which assumes that each HBA 156, 256 and disk 140 has only one connection to the storage interconnect 38. In general, as depicted in FIG. 1, each HBA 56 and storage device 40 may have multiple such connections, and it will be appreciated that the number of potential paths between a given HBA 156, 256 and disk 140 may be correspondingly greater.

In the configuration of FIG. 4, the only path to disk D3 140(3) is via NHBA1 256(1), which means that there is no hardware-assisted encryption available for encrypting/decrypting data of that disk. The significance of this incapability is described below.

In an arrangement such as that of FIG. 4, the multipathing module 82 is responsible for maintaining an awareness of which disks 140 it can "reach" (engage in I/O operations with) as well as the corresponding set of usable paths to each reachable disk. The virtualization module 80 maintains an awareness of the disks (e.g., D1 140(1) and D4 140(4)) which underlie each logical volume (e.g., L1 88(*a*)). Upon receiving storage commands (I/O commands including reads and writes of storage data) directed to logical volume L1 88(*a*), the virtualization module 80 generates corresponding storage commands to D1 and D4 and issues these commands to the multipathing module 82. The multipathing module 82 responds by selecting a path for each command and issuing the command to the HBA 56 for the selected path. Storage commands directed to an encrypted region of a disk 140 may utilize hardware-assisted encryption provided by an EHBA 156 along a selected path. In the event that a disk 140 is not reachable via an EHBA 156 (such as disk D3 140(3) as mentioned above), any such storage commands may instead utilize the encryption functionality of the crypto kernel 84.

Figure 5A:
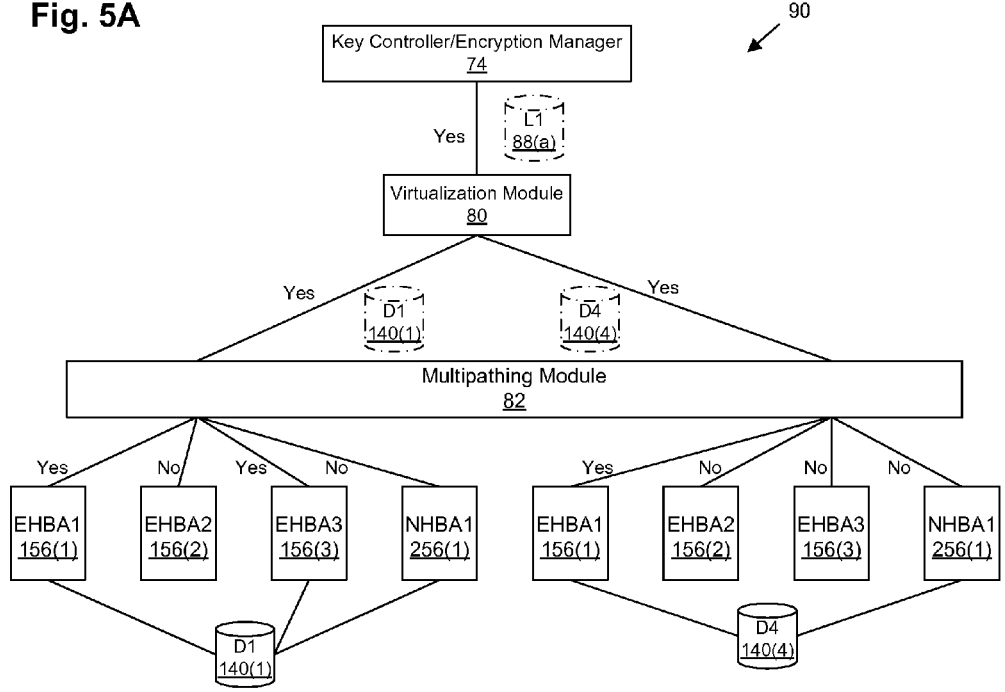
FIG. 5A depicts an example scenario according to one embodiment.
Figure 5B:
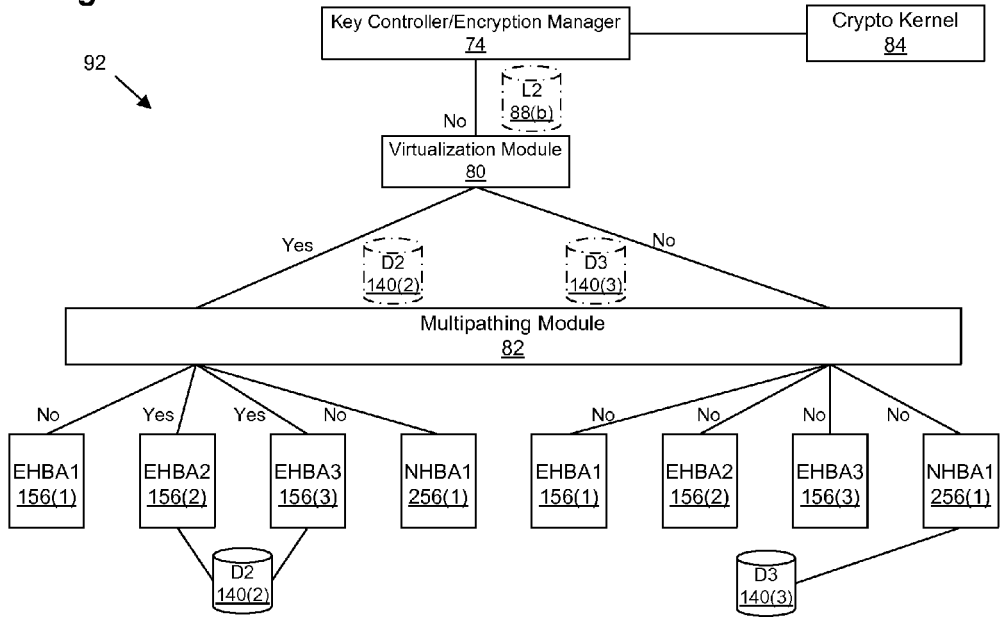
FIG. 5B depicts an example scenario according to another embodiment.

FIGS. 5A and 5B illustrate specific examples of the above-described operation in greater detail. In these figures, the labels "yes" and "no" are used to indicate whether a given HBA 156, 256 between the multipathing module 82 and a disk D1-D4 provides a path with hardware-assisted encryption to the disk. Thus, the label "no" appears for each NHBA 256 (because it is non-encrypting) and for each EHBA 156 that has no connection to a given disk D1-D4.

FIG. 5A depicts one arrangement 90 for disks D1 and D4 of logical volume L1. showing that logical volume L1 88(*a*) may be encrypted using hardware-assisted encryption, because each underlying storage device D1, D4 for L1 can be accessed through an EHBA 156. In particular, storage device D1 may be accessed with hardware-assisted encryption via EHBA1 156(1) and EHBA3 156(3) (as indicated by the "Yes" along the connections between multipathing module 82 and the EHBAs 156(1) and 156(3) at the left side of FIG. 5A). Storage device D4 may be similarly accessed through EHBA1 156(1) (as indicated by the "Yes" along the connection between multipathing module 82 and EHBA1 156(1) at the right side of FIG. 5A). Thus, a combination of EHBA1 156(1) and EHBA3 156(3) may be used to perform all encryption operations for accessing logical disk L1 88(*a*).

FIG. 5B depicts an alternative arrangement 92 for a second logical disk L2 88(*b*) and its underlying disks D2 140(2) and D3 140(3). As shown, disk D3 is accessible only via NHBA1 256(1). Therefore, encrypted storage operations for logical disk L2 88(*b*) cannot utilize hardware-assisted encryption, because not all of its underlying storage devices (D3 in particular) can be accessed via an EHBA 156. Thus, in arrangement 92, crypto kernel 84 is used to perform the encryption operations required by any data storage operations to be performed on logical disk L2 88(*b*).

The above description in connection with FIGS. 4 and 5A-5B illustrates certain important aspects of using hardware-assisted encryption in a system such as that of FIG. 1. First, it must be possible for an EHBA 156 to obtain the encryption metadata (including encryption key) for those regions of encrypted storage for which that EHBA 156 will handle data storage commands, so that the encryption circuitry of the EHBA 156 can perform the correct encryption/decryption operation using the correct key for each distinct region of storage. As the KCM 74 is the overall manager of encryption operations for the host 36 in which an EHBA 156 resides, a mechanism is needed to enable the KCM 74 to communicate the encryption metadata to its EHBAs 156. Additionally, a mechanism is needed for the KCM 74 to ascertain whether hardware-assisted encryption is available for any given region of storage. Both these needs are further complicated by the presence of ILs 76, especially those (like virtualization module 80) which are "remapping" layers that effect a translation or mapping between two different representations of a given storage volume. Additionally, even non-remapping layers like the multipathing module 82 create potential problems, because hardware-assisted encryption may not be available on all paths for a given disk 140, yet the system must ensure that encryption is performed reliably. All these issues point to the need for a communications protocol among the different layers of the storage I/O stack 66 to support the data encryption function.

FIG. 6 depicts an example method 1000 for setting up encryption on a logical disk (e.g., logical disk L1 88(*a*)) and then performing encrypted storage operations in an efficient manner. FIG. 6 is directed to the specific case of hardware-assisted encryption, but several aspects of the method are more generally applicable to the use of other types of EEs, which perform cryptographic processing (e.g., encryption, decryption, or both), as explained below. In one embodiment the method is performed using an "in-band" communications protocol among the various components of the storage I/O stack 66. Here "in-band" refers to the fact that communication related to the method is performed along the same data path as the I/O commands. The communications protocol messages are sent among the participants in the protocol using an in-band transport mechanism. In one embodiment, the in-band transport mechanism employs a special SCSI Read command and its response that travel along the data path (including up and down the storage I/O stack 66) as do normal SCSI commands (reads and writes) and responses. The protocol messages may be embedded in the read buffer of such a special SCSI read command. The communications protocol is referred to below as a "DEK management protocol," where the acronym DEK stands for "data encryption key."

In the case of the SCSI Read transport, the special SCSI read command used for transport may be a regular SCSI read along with its associated response. Within the host 36, the SCSI read includes a command data block and a read buffer meant to receive the data being read. The SCSI read uses a special combination of starting LBA and length values—for example, an odd-numbered starting LBA and a small, odd-numbered length may be used. As one specific example, the starting LBA of 1009 and length of 3 is used. Such an unusual combination is very unlikely to be used in any normal read access by an application 58 or the OS 60. A functional component can examine the command data block for this combination and identify the read as a transport message rather than a normal storage I/O command. The functional component then examines the corresponding read buffer for the protocol command or response stored therein.

It will be appreciated that there may be a small but non-zero chance that a non-transport message could be interpreted erroneously as a transport message. As an example with respect to the SCSI Read transport scheme, an application 58 could issue a normal read command that happens to have the same address and length of the special SCSI read command used for transport. To reduce the chance of this occurring, the protocol commands and responses include protocol signatures to identify them as such in the transport message and response. As described below, the protocol commands and responses are organized into blocks or structures with fields having defined locations therein. The locations of the fields in the structures correspond to locations in the transport message (the read buffer of the SCSI read command). Thus, a valid protocol signature must be present at an expected location of a transport message and transport response as a condition to interpreting the contents of the transport message/response as a protocol command or response.

It is noted here that strictly speaking, the label "transport" may be seen as misdescriptive in the case that a valid protocol signature is not found, as there is no valid protocol message being transported. In the interest of simple expression herein, the term "transport message" should be understood as including a message that meets the specification of a transport message (e.g., a read with special address/length information) even though it may not contain a valid protocol command or response. By "up and down" the storage I/O stack 66 it is meant that a DEK management protocol command may be created by KCM 74 then passed to a top-level IL 76, such as virtualization module 80. That IL 76 examines the command and, in most cases (exceptional cases are discussed below), will send one or more corresponding commands to the next IL 76 down the stack, such as multipathing module 82. This pattern repeats until one or more commands reach HBA driver(s) 67. Responses flow in the other direction, from the HBA drivers 67 upward to the KCM 74. In some cases, commands may not travel completely down the storage I/O stack 66, and responses may be generated and sent upwards by one or more ILs 76. By this chain-like communications mechanism, information required for proper encryption-related operation is shared among the various components of the storage I/O stack 66.

In one embodiment, the KCM 74 uses the DEK management protocol to first determine whether or not there is an EHBA 156 (or a set of multiple EHBAs 156) that can provide encryption for each encrypted region of the logical disk L1 88(*a*). If not, then it is deemed that EHBA encryption is not available, and the KCM 74 assumes responsibility for encryption/decryption operations for the logical disk L1 using the crypto kernel 84. If the KCM 74 determines that such EHBA encryption is available, it uses the DEK management protocol to provide the required encryption metadata to each EHBA 156 that requires it. Subsequently, storage I/O commands directed to the logical disk L1 are sent down the stack 66 for execution, relying on operation of one or more EHBAs 156 for the for the data encryption/decryption part of operation for the encrypted regions.

As previously noted, encryption may be applied to separate "regions" of a given volume 88 or disk 140. Here "region" refers to a span of contiguous logical block addresses (LBAs). To illustrate the concept, assume a hypothetical simple volume 88 having 16 blocks of storage with addresses 0 through 15. The volume may have an encryption pattern as follows:

| LBA range | Encryption? |
| --- | --- |
| 0-3 | Not encrypted |
| 4-12 | Encrypted |
| 13-15 | Not encrypted |

The overall pattern for a given logical unit of data (LU) is referred to below as a "LUN map" (the term "LUN" is commonly used in the industry to refer to an LU). In operation, it is necessary for the KCM 74 to provide the LUN map for each volume to any EHBA 156 that will handle I/O for that volume. It is assumed herein that only one data encryption key is used for each volume, although in general it is possible to use different keys for different regions, for example.

In a somewhat more realistic example, an encrypted LU may store metadata and formatting information in unencrypted form. In addition, certain additional regions of an encrypted LU may be designated as unencrypted for various reasons (e.g., to enhance performance on a region that is frequently accessed). For example, logical disk L1 88(a) may be an encrypted LU having a size of 10 megabytes. Given a 512-byte block size, logical disk L1 88(a) has 20,480 blocks. Blocks 0-1023 may be unencrypted and reserved for operating system use, while blocks 1024-1535 may be unencrypted and reserved for storing encryption metadata. Blocks 1536-10,239 may be encrypted, blocks 10,240-11,263 may be unencrypted for performance reasons, and blocks 11,264-20,479 encrypted. Thus, only blocks 1536-10,239 and 11,264-20,479 of logical disk L1 88(a) are subject to encryption.

Additionally, the virtualization module 80 distributes the blocks of logical disk L1 88(a) out across D1 140(1) and D4 140(4). For example, blocks 0-10,239 may be stored on D1 140(1), while blocks 10,240-20,479 are stored on D4 140(4). This arrangement places portions of logical disk L1 88(a) subject to encryption on both D1 140(1) and D4 140(4). It should be noted that the mapping between L1 and D1/D2 may not (and in many cases will not) preserve LBAs. Thus blocks 0-10,239 of L1 may be mapped to blocks 32,000-42,239 of D1, for example.

Referring again to FIG. 6, in step 1010, KCM 74 determines if there exist one or more EEs (e.g., EHBA(s) 156) that can perform encryption/decryption for all encrypted regions of an encrypted logical volume (LV). If step 1010 returns an affirmative response, execution proceeds with step 1050, while if step 1010 returns a negative response, execution may proceed with step 1070. At step 1070, it is concluded that there is no EE to perform encryption/decryption for the subject volume/disk, which means that any required encryption/decryption operations are to be performed by the KCM 74 using the crypto kernel 84. As described above with reference to FIGS. 5A and 5B, in the present example the condition of step 1010 is satisfied for logical disk L1 88(a). However, for logical disk L2 88(b), step 1010 evaluates in the negative because there is no encrypted path to D3 140(3), and thus the method will execute step 1070 with respect to logical disk L2 88(b). It should be noted that in some embodiments, even if an EHBA 156 is present on all paths to a storage device 40, condition 1010 could still fail if an essential path (or an essential group of paths) is blocked by an error in the EHBA 156 (e.g., the EHBA 156 has no remaining capacity or is temporarily offline).

As shown in FIG. 6, step 1010 may be accomplished by performing one or both of sub-steps 1012 and 1016, which perform Handshake and Query operations. In connection with these sub-steps, different specific commands and responses of the DEK management protocol are used as described more fully below. Table 1 provides a general structure for a DEK management protocol command block used in performing these operations:

TABLE 1

| General command block format | |
| --- | --- |
| Bytes | Field |
| 0-7 | (8 bytes) Protocol Signature |
| 8-15 | (8 bytes) Checksum |
| 16-19 | (4 bytes) Version |
| 20-23 | (4 bytes) Reserved |
| 24-27 | (4 bytes) DEK Management protocol Opcode |
| 28-31 | (4 bytes) DEK Management protocol Response Status |
| 32-39 | (8 bytes) DEK Management protocol Endpoint ID |
| 40-47 | (8 bytes) Key Controller Handle |
| 48-1535 | Command Specific Parameters and Data |

The general command block format is a structure having a format as shown in Table 1. In some embodiments, all commands are a maximum of 1536 bytes (3×512-byte blocks) long, although this is by way of example only. In some embodiments, DEK management protocol command blocks are implemented within the read buffer of SCSI Read commands. The fields and arguments are described below. In the description below, the label [In] means the parameter is an "input" passed from the KCM 74 in/down to the EE (via one or more ILs 76), while [Out] means the parameter is an "output" returned by the EE out/up to the KCM 74 (via one or more ILs 76). "Initiator" means the KCM 74 or cooperating IL 76 that generates a protocol command. "Device Object" means a device managed by a driver in the storage I/O stack 66. It may be a volume, an LV, an LU, a path device, or a storage device.

The following is a description of the various fields in the general command block shown in Table 1 above:

Protocol Signature—8 bytes—[In] identifies the contents as a DEK Management protocol message, (to distinguish DEK management protocol communications from other communications or even gibberish that might occupy a protocol transport message as discussed above). In some embodiments, the protocol signature is also used to detect the presence or absence of certain essential ILs 76, as discussed below in the context of FIGS. 8-10. During the "Handshake" operation of step 1012 (described below), the signature is set to a predefined value (e.g., 0x0a, 0x0b, 0x0c, 0x0d, 0x0e, 0x0f, 0x10, 0x11) by the KCM 74. The protocol signature is generally echoed back unchanged by the EE for all commands. In certain embodiments, during a Handshake command the predefined value used by later DEK commands is only used towards the bottom of storage I/O stack 66. In these embodiments, discussed in further detail below in connection with FIGS. 8-10, one or more additional predefined values are used higher up within storage I/O stack 66 during Handshake commands.

Checksum—8 bytes—[In] Used as a means of validating a DEK management protocol command block. Contains a 32 bit cyclic-redundancy-check checksum of bytes 16 to 1535, stored in a longword. Calculated by the KCM 74 before sending the command down.

Version—4 bytes—[In] DEK Management protocol version identifier.

DEK management protocol Opcode—4 bytes—[In] DEK Management protocol operation to be performed. Opcodes includes values for Handshake, Query, Associate, Update, and Disassociate. If an EE had been doing encryption for a Device Object, it can release any resources associated with that object after a Disassociate command and can keep them released until it sees a new Associate command. Associations are described below.

DEK management protocol Response Status—4 bytes—[Out] Reports completion status for the protocol command. Set by the EE. Examined by the ILs 76 and potentially modified by them. Examined by the KCM 74. Valid values for this field can include Success as well as various values representing failure due to a number of possible errors.

DEK management protocol Endpoint ID—8 bytes—[In/Out] Unique identifier for the EE's use. Its content varies by Opcode: returned up to the KCM 74 on a Handshake and echoed (sent back down to) the EE in Query, Associate, Update, and Disassociate commands.

Key Controller Handle—8 bytes—[In] Contains a handle used by the Initiator to match a DEK management protocol response with its originating command. The EE and ILs 76 should echo/return this field unchanged.

Command Specific Parameters and data—Up to 1488 bytes of command-specific data. Examples are discussed below.

Referring again to FIG. 6, in step 1012 KCM 74 sends a Handshake command down to the next IL 76 in order to test for the existence of a cooperating EE in the storage I/O stack 66.

The KCM 74 sends the Handshake command as the first DEK management protocol command to a Device Object. Only one Handshake at a time should be outstanding to a given device object. The EE should not trigger an internal state change upon receipt of a Handshake, e.g., a Handshake command should not reset associations currently in effect for a Device Object.

Generally, KCM 74 will send one Handshake command per LV that it manages. As long as KCM 74 receives one affirmative Handshake response in response to the Handshake command, KCM 74 will proceed to step 1016. Otherwise, KCM 74 will proceed with software encryption.

When a cooperating IL 76 receives a Handshake command from above in the storage I/O stack 66, it passes the command down to the next level down in the storage I/O stack 66. If the LU potentially involves multiple EEs of the storage I/O stack 66, then the IL 76 will replicate the command (potentially with modification as discussed below) and send a copy down the storage I/O stack 66 toward each such EE.

For example, if the IL 76 is a virtualization module 80 that virtualizes the LU across two storage devices 40(*a*) and 40(*b*), then virtualization module 80 sends two copies of the Handshake command down the storage I/O stack 66, one referencing storage device 40(*a*) as the device object, and the other referencing storage device 40(*b*) as the device object. If the virtualization module 80 receives any affirmative Handshake responses, the virtualization module 80 responds back to the KCM 74 with an affirmative response. This indicates to the KCM 74 that there is at least one EE that may require encryption metadata. However, it should be understood that in some embodiments, some ILs 76 may be configured to respond negatively if any of the Handshake responses from below are negative.

The DEK management protocol supports multiple "classes" of EEs. An EE of a cooperating class ignores Handshake commands that do not contain its class name and acknowledges a Handshake addressed to its EE class name by filling in the Endpoint ID field.

See Table 2, below, for an example layout of a Handshake command block with Handshake-specific definitions of bytes 48-1535.

TABLE 2

Handshake command block format

| Bytes | Field |
|---|---|
| 0-7 | Protocol Signature |
| 8-15 | Checksum |
| 16-19 | Version |
| 20-23 | Reserved |
| 24-27 | Handshake Opcode |
| 28-31 | DEK management protocol Response Status |
| 32-39 | DEK management protocol Endpoint ID |
| 40-47 | Key Controller Handle |
| 48-303 | (256 bytes) Encryption Endpoint Class Name |
| 304-511 | (208 Bytes) Reserved |
| 512-1023 | (512 Bytes) Pseudo-random bytes |
| 1024-1151 | (128 Bytes) Reserved |
| 1152-1407 | (256 Bytes) Pseudo-random bytes |
| 1408-1535 | (128 Bytes) Reserved |

The following is a description of the various fields in the Handshake command block shown in Table 2 above:

DEK management protocol Endpoint ID—8 bytes—[Out] Returned by the EE and for its internal use: the KCM 74 echoes (and thus addresses) this Endpoint ID in subsequent Query, Associate, and Disassociate commands for the Device Object. (An IL 76 creating a protocol command would use this Endpoint ID to address the EE.)

Endpoint Class Name—256 bytes—[In] Each class of EE has a name, expressed, for example, as a null-terminated ASCII string. Example endpoint class names include: "EHBA" for an HBA 56 with a encryption circuitry (i.e., an EHBA 156); "DDM" for a data de-duplication module, which is typically an external intermediate device; and "RRM" for a remote replication module, which is also typically an external intermediate device.

Pseudo-random bytes [512-1023]—512 bytes—[In/Out] "Handshake" region #1 is filled with pseudo-random data by the KCM 74 and sent down to the EE. The EE signals its presence in the storage I/O stack 66 to the KCM 74 by, for example, reversing the order of all 512 bytes in this region. This field is passed through untouched by ILs 76, although if multiple Handshake responses are received from below, the IL 76 will choose the field from the appropriate received Handshake response to indicate affirmative or not, as appropriate. This field may also be generated by an IL 76 that creates a command.

Pseudo-random bytes [1152-1407]—256 bytes—[In/Out] "Handshake region #2 is similar to "Handshake" region #1. The Encryption Endpoint reverses all 256 bytes in this region before returning a response to the command.

Reserved bytes [20-23, 304-511, 1024-1151, 1408-1535]—468 bytes—Undefined. Reserved for future use. Set to 0x00 by the KCM 74, ignored by the IL 76 and EE. These bytes are covered by the checksum. An IL 76 should not overwrite them. They are included in checksum to guard against false positive of a SCSI or other I/O command being interpreted as a DEK management protocol command.

The EE is expected to update the version field if the version supported by EE is different than requested by KCM 74. The ILs 76 are also expected to ensure version compatibility with the EE. If the EE supports a lower version than required by the IL 76, IL 76 should fail the Handshake request.

In the case of a Handshake command directed to an NHBA 256 (see FIG. 5A or 5B), it will normally be desirable for the HBA driver 67 to provide an indication that there is no EE on the path containing the NHBA 256. This can be accomplished, for example, by the HBA driver 67 simply not returning a Handshake response, which will be detected by any higher layer that is awaiting a response and will provide the desired indication. Alternatively, the HBA driver 67 may return a negative Handshake response, which can be done in a variety of ways. For example, the driver 67 may send a handshake response with a blank DEK management protocol Endpoint ID field, or with a DEK management protocol Response Field having an error code, or with non-reversed bytes in Handshake region #1 or #2, or some combination of these indicia.

It should be noted that during the handshake operation as described above, each participant in the DEK management protocol is expected to use the correct protocol signature value in the protocol signature field, and that a possible protocol command or response be tested for presence of the correct protocol signature value as a condition to being interpreted as an actual protocol command or response. In the event that an expected protocol signature value is not found at the location of the protocol signature field in a transport message, the contents of the transport message should not be interpreted as a protocol command or response. In the case of the SCSI Read transport described herein, it is expected that a layer encountering this condition will instead treat the SCSI Read as a normal read command and process it accordingly, which in general will result in forwarding the SCSI Read along the data path toward the target storage device 40.

Referring again to FIG. 6, in step 1016, KCM 74 sends a Query command down to the next IL 76 to determine if an encryption capability such as hardware-assisted encryption is supported for a specified range on an LV. Each IL 76 between the KCM 74 and the EE responds to the Query based on the encryption capabilities of the underlying devices.

An IL 76 broadcasts the Query command to all the underlying devices and aggregates the results of individual queries into one response to the KCM 74 (or an IL 76 above it). The response from an IL 76 should not lead to data corruption. For example, an IL managing a virtual volume spanning two underlying LUs should support hardware-assisted encryption on the virtual volume only if the paths to both the LUs have hardware-assisted encryption available.

For example, if the IL 76 is a virtualization module 80 that virtualizes a logical volume across two storage devices 40(a) and 40(b), then virtualization module 80 sends two copies of the Query command down the storage I/O stack 66, one referencing storage device 40(a) as the device object, and the other referencing storage device 40(b) as the device object. Generally, only if the virtualization module 80 receives affirmative Query responses for both storage devices 40(a) and 40(b) will the virtualization module 80 respond back to the KCM 74 with an affirmative response, however, this behavior may differ if a particular form of virtualization is performed that allows otherwise. For example, in the case of a read-only LV mirrored onto two or more distinct LUs, as long as one of the LUs is readable with encryption at the level of an EHBA 156, the virtualizing IL may return an affirmative response, even if a negative response is returned for one of the LUs.

As an alternate example, if the IL 76 is a multipathing module 82 having paths through multiple HBAs 56 to a given storage device 40, then the multipathing module 82 sends copies of the Query command to all such HBAs down the storage I/O stack 66. If the multipathing module 82 receives any affirmative Query responses, the virtualization module 80 respond back to the KCM 74 with an affirmative response.

An EE looks for the Endpoint ID in the payload that matches its ID (i.e., the Endpoint ID that is sent up by the EE to the KCM 74 in the Handshake response), and returns affirmatively if it can perform its encryption capabilities on the specified ranges for the device object. Otherwise the EE may return in the negative (e.g., if the EE does not have a connection to the appropriate storage device 40, if the EE was not initialized, or if the EE is temporarily busy and the command should be retried).

Included within the Query command is a LUN Map, which defines the areas subject to encryption. Each area is provided with reference to a Logical Block Address (LBA), which is an abstraction of the block addresses at a given layer of logical abstraction. Returning to the example provided above in which logical disk L1 88(a) is an encrypted LV 10 megabytes in size, blocks 1,536-10,239 and 11,264-20,479 of logical disk L1 88(a) would be listed as subject to encryption.

Some ILs 76 may remap the LUN map as appropriate. These ILs 76 are referred to as "remapping" ILs 76. For example, a virtualization module 80 is an example of a remapping IL 76, while a typical multipathing module 82 is not a remapping IL 76. Recall that, in the example, blocks 0-10,239 of logical disk L1 88(a) are stored on D1 140(1), while blocks 10,240-20,479 are stored on D4 140(4). Further suppose that the encrypted blocks stored on D1 140(1) begin at local block 1,000,000, while the encrypted blocks stored on D4 140(4), begin at local block 2,097,152, but actually are spread out across 2 ranges: 2,097,152-2,101,759 and 3,145,728-3,150,335. Therefore, in the Query command passed on to storage device D1 140(1), the LUN Map will indicate LBAs 1,000,000-1,008,703; and in the Query command passed on to storage device D4 140(4), the LUN Map will indicate LBAs 2,097,152-2,101,759 and 3,145,728-3,150,335.

See Table 3, below, for an example layout of a Query command block.

TABLE 3

Query command block format

| Bytes | Field |
| --- | --- |
| 0-7 | Protocol Signature |
| 8-15 | Checksum |
| 16-19 | Version |
| 20-23 | Reserved |
| 24-27 | Query Opcode |
| 28-31 | DEK management protocol Response Status |
| 32-39 | DEK management protocol Endpoint ID |
| 40-47 | Key Controller Handle, Undefined |
| 48-71 | (24 bytes) Undefined |
| 72-75 | (4 bytes) LUN Map Count |
| 76-83 | (8 bytes) Starting LBA Entry [0] |
| 84-91 | (8 bytes) Number of Blocks [0] |
| 92-99 | (8 bytes) Starting LBA Entry [1] |
| 100-107 | (8 bytes) Number of Blocks [1] |
| 108-1019 | LBA Range Structures [2] to [58] |
| 1020-1027 | (8 bytes) Starting LBA Entry [59] |
| 1028-1035 | (8 bytes) Number of Blocks [59] |
| 1036-1535 | Reserved |

The following is a description of the various fields in the Query command block shown in Table 3 above:

DEK management protocol Endpoint ID—8 bytes—[In] Returned by the EE in the Handshake command response, echoed back by KCM 74, thus addressing the Endpoint ID.

Undefined bytes [48-71]—24 bytes—[In/Out] Undefined, can be anything. Included in checksum.

LUN Map Count—4 bytes—[In] Number of valid LUN Map entries being queried. Must be at least one and not greater than the total entries that can fit in the read buffer, (e.g., 60.) The IL 76 validates the map.

LUN Map Entry—16 to 960 bytes (up to 60 16-byte structures)—[In] The LUN map is a list of LBA ranges on the LU. Each LUN Map entry contains 2 sub-entries, each of which is, for example, a 64-bit integer: a starting LBA; and a number of blocks. Any remapping IL 76 can adjust the starting LBA and/or number of blocks as the request for association flows down the stack.

Reserved bytes [1036-1535]—Undefined and reserved for future use.

Recall that, if step 1010 returns an affirmative response, execution proceeds with step 1050, while if step 1010 returns a negative response, execution may proceed with step 1070. In some embodiments, step 1050 may also be executed on its own, without first performing step 1010.

In step 1050, KCM 74 sends encryption metadata associated with the encrypted LV from the KCM 74 to the EE via ILs 76, the encryption metadata identifying an encryption key and one or more encrypted regions of the LV. The encryption metadata may also identify other associated encryption information needed to perform the encryption algorithm, such as, for example, an identification of the encryption algorithm. The sending results in establishment of one or more shared associations between the KCM 74 and the EE, the shared associations associating the encrypted LV with the encryption metadata for the encrypted LV. In one embodiment, this step is accomplished using the DEK management protocol by sending a DEK Management Associate command.

The Associate command creates an association of (1) an Encryption Key Blob, with (2) a LUN Map on (3) a Device Object, thereby effectively turning on encryption for the LU and LBA Range(s). The Key Blob is a set of encryption metadata, storing the key and all the other information needed to perform encryption/decryption that is stored on the key manager, as described below. Although in the on-host case, the key blob is sent within the Associate command, in an off-host case, the key ID may be sent within the Associate command instead of the key blob (or, in some embodiments, an encrypted version of the key blob, referred to as a "wrapped" key blob, may be sent). Multiple Key Blob/LUN Map Associations can be made for a Device Object. Associate commands can be generated by the KCM 74 and by ILs 76, although ILs 76 do not originate an association, but rather pass on one or more copies (with modifications as necessary) of an Associate command received from above. In some cases, the association may also include Application information.

There are two forms of an Associate command:

New Association—creates a new association. In the case of a new association, the Associate command arrives at the EE or IL 76 with a Null "Association Handle" (see below). This tells the EE/IL 76 that this association does not currently exist, that it should be created and that an Association Handle reference should be created and returned in the Associate response.

Refresh Association—the Refresh Association originates from the KCM 74 and exists for the benefit of the ILs 76 or the EE. In the case of a Refresh Association, the Associate command arrives at the EE or IL 76 carrying the Association Handle created by the EE (or an IL 74) as part of a preceding initial association.

An EE should respond as follows for the different Association types/association handle values:

If the Association Handle is NULL—it means the KCM 74 or an IL 76 is creating a new Association, so the EE should:
Validate the parameters as needed (see below).
Create the Association.
Return a Handle for the Association.
If the EE already has an association, provided there is no range overlap, it should ignore the existing association and treat the request as a new association.

If the Association Handle is not Null—it means the Association exists, so the EE should:
If the Associate carries the same LUN Map and Key Blob specified in the original Associate, then return Success status.
Else—something is wrong, this should not happen—so respond negatively by returning an Association Exists status.

Any Associate command (whether the first or a repeat) should be preceded by a Query command—though the EE does not need to enforce this.

Figure 7:
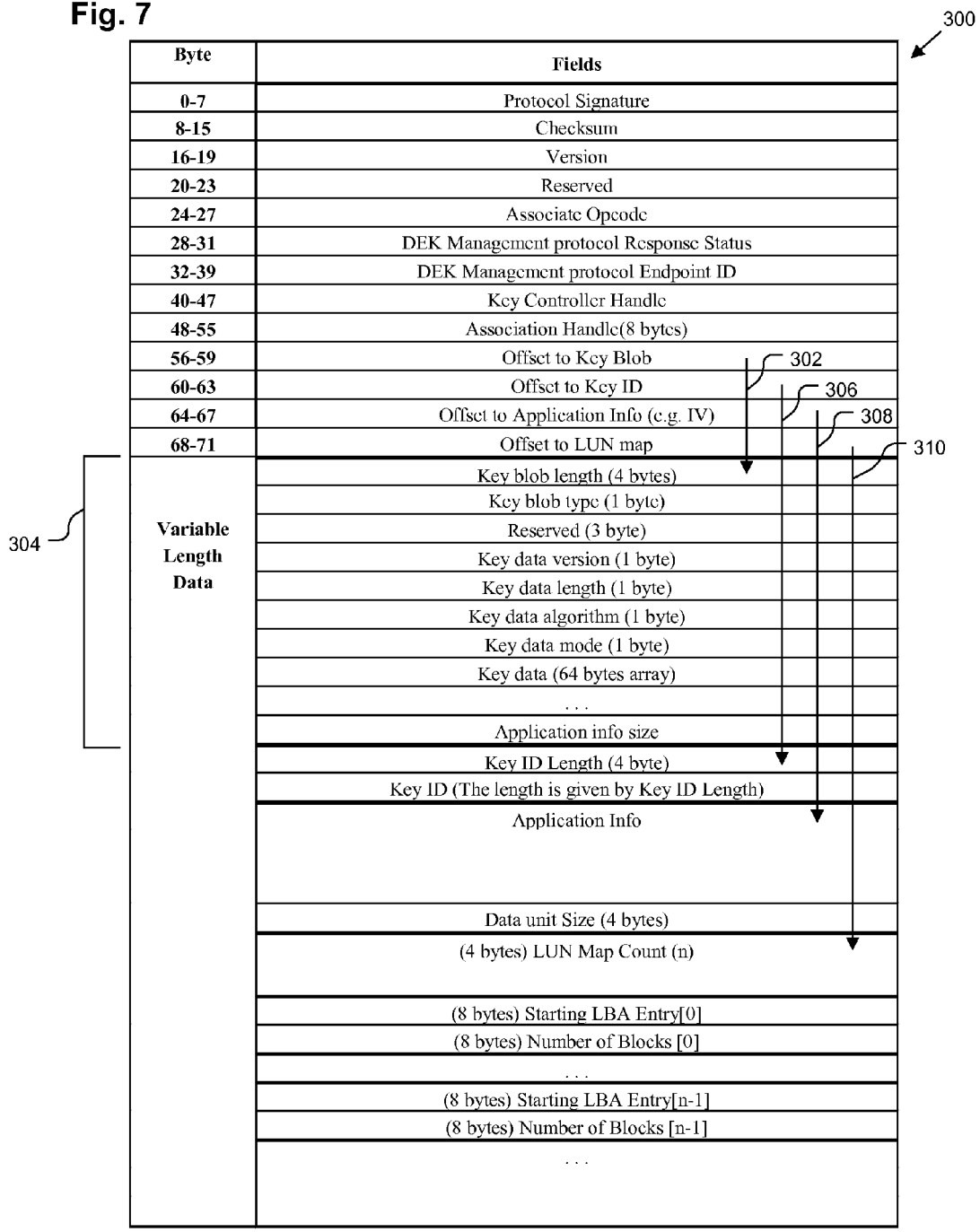
FIG. 7 depicts an example Associate Command Block according to one embodiment.

FIG. 7 shows an example layout of an Associate command block 300. The following is a description of the various fields in the Associate command block 300 shown in FIG. 7:

DEK management protocol Response Status—4 bytes—[Out] possible returns are Success, Invalid HW State, No Memory, Busy, Invalid Range, Invalid Key, Association Exists, Association Overflow.

DEK management protocol Endpoint ID—8 bytes—[In] Echoed from the EE's response to the initial Handshake command. Address of the EE for the Associate. The EE passes on an Associate command that does not contain the EE's Endpoint ID.

Association Handle—8 bytes—[In/Out]
[In] Zero—first time Association. An Association Handle is returned by the EE or IL 76. The handle is an internal value used by the EE or IL 76 for accessing an association. The Association Handle is subsequently passed back down by the KCM 74 to the EE in Update and Disassociate commands. An EE assigns a unique association handle for each association created. ILs 76 may need to replace the association handles based on their internal device mappings, so that a single handle is returned to the KCM 74. An IL 76 keeps track of the handle(s) returned from below it and uses those handles for passing down any subsequent Associate or Disassociate command.
[In] Non-zero implies KCM 74 is attempting to refresh an existing association. When dispatching it to the newly discovered devices, the ILs 76 should zero out the association handle and replace the handle with the new handle on the way up to KCM 74.

Data Encryption Key Parameters—
The association handle is followed by offsets to various data items 304:
Key Blob 304 (4 bytes) (offset shown as 302 in FIG. 7)
Key ID (4 bytes) (offset shown as 306 in FIG. 7)
Application Info (4 bytes) (offset shown as 308 in FIG. 7)
LUN Map (4 bytes) (offset shown as 310 in FIG. 7)
These offsets 302, 306, 308, 310 are followed by the following variable length parameters:
Key Blob 304
Key Blob Length—4 bytes[In]—The number of bytes in the key blob Key Blob Type—1 byte [In]—This field indicates whether the format of the key blob is "wrapped" (i.e., encrypted, as, for example, it may be when being sent off-host to an external intermediate device 42 or when being sent within a highly-secure system) or "unwrapped" (i.e., unencrypted, as for example, it may be when being sent to an EHBA 156 within the host 36).

Key Data

Key Data Version—1 byte [In]—Versioning information for the key data

Key Data Length—1 byte [In]—Length of the symmetric key

Key Algorithm—1 byte [In]—Algorithm

Key Mode—1 byte [In]—Algorithm Mode

Key Data—64 bytes [In]—Carries the key data of the length "Key Data Length". Extra bytes, if any are, zero.

Application info size—1 byte—[In] maximum accepted size of the application information.

Key ID

Key ID Length—4 bytes [In]—Number of bytes in key ID

Key ID bytes—[In]—Key ID bytes

LUN Map Count—4 bytes [In]—Number of valid LUN Map entries being reported. It should be at least one. Implementations can restrict the number of LUN map entries supported.

LUN Map Array—16 to 960 bytes (up to 60 16-byte structures)—[In] Specifies the LBA ranges on the Device Object to associate with the Key Blob 304 or Key ID. Sub-fields include starting LBA and a length or LBA-count. Unused map entries are set to zero.

Reserved bytes [variable-1535]—Unused and undefined

Upon successful completion of an Associate during step 1050, an EE is ready to apply encryption/decryption to the encrypted regions of a LU as defined in the LUN map, using the encryption metadata from the Key Blob and the application information. As long as the association remains active, subsequent read/write commands directed to these regions employ decryption/encryption using the encryption metadata. This operation is depicted in step 1060.

The DEK management protocol may also employ Update and Disassociate commands. An Update command tells the EE to update the association for the Device Object with the Key Object and LUN map information in the protocol command block. It provides an atomic way for an EE to effectively delete and create an association in one step. It would be used, for example, to support resizing of an encrypted LU.

The Disassociate Command deletes the association that had been created with a previous Associate command for a Device Object. Subsequent read and write commands in the LBA range(s) covered for that association are no longer encrypted/decrypted by the EE. Disassociate is used when the EE can no longer perform its duties and a switch to encrypting using the crypto kernel 84 is needed. Switching back happens through a new Associate command. An example, looking back at FIG. 4, would be if EHBA1 failed for some reason. D1 and D4 would still be reachable by EHBA3 and NHBA1, respectively, but the Crypto kernel 84 would have to be used so the Disassociate would be sent on L1.

Both the Update (which, in some embodiments, is an Associate command containing a valid non-null handle) and Disassociate commands include an Association Handle to identify the subject association.

Confirming Presence of Essential Layers

The operation described above with reference to FIGS. 1-7 is based on the ability of at least certain ILs 76 to communicate using the DEK management protocol and perform protocol-related processing, such as replicating or broadcasting Query or other protocol commands to lower-level drivers. If one or more ILs 76 are of a type deemed "essential" (as described more below), then improper system operation could result if those ILs 76 are not capable of protocol communications and operations. This kind of situation could occur, for example, if for some reason a third-party or older-generation IL 76 were used in a system where a protocol-capable IL 76 is necessary. Although this can be avoided by proper configuration of the host 36, the DEK management protocol can be used to confirm that the I/O stack 66 is configured properly, so that incorrect system operation can be avoided in the event of improper configuration.

In the following description, the term "cooperating" is used to describe an IL 76 that is capable of communicating and operating with the DEK management protocol. A "non-cooperating" IL 76, by contrast, is an IL 76 that does not communicate or operate with the DEK management protocol. It will be appreciated that, due to the use of an in-band transport mechanism as described above, a non-cooperating IL 76 can pass protocol messages up and down the I/O stack 66 while being unaware of their protocol contents, and thus does not interfere with the movement of messages among cooperating layers of the I/O stack 66. However, such a non-cooperating IL 76 does not affect the conduct of protocol-related communications and operations.

An example of the need to confirm proper configuration of the I/O stack 66 is now given based on the scenario of FIG. 5A. In that example, the multipathing module 82 uses the DEK management protocol to ascertain that it has at least one encrypting path to each disk D1 140(1) and D4 140(4), i.e., at least one path on which data encryption/decryption is provided by a corresponding EHBA 156. Upon determining this condition, the multipathing module 82 signals to the virtualization module 80 (using the protocol) that hardware-assisted encryption is available for both disks D1 and D4.

If the multipathing module 82 were non-cooperating, then there is a possibility that the execution of the DEK management protocol could result in a false positive indication to the virtualization module 80. For example, the Handshake, Query and Associate commands sent down the stack by the virtualization module 80 could all be routed by happenstance toward the EHBA1 156(1), so that it becomes properly configured for encryption operation. However, none of the other EHBAs 156 will have been properly configured, because the non-cooperating multipathing module 82 has not replicated the protocol commands to these components in the manner discussed above. Moreover, the non-cooperating multipathing module 82 is unaware that I/O commands should be routed only through an EHBA 156 and not an NHBA 256. Thus, during subsequent operation, the multipathing module 82 may route I/O commands to an NHBA 256 or to an EHBA 156 having no valid encryption association as would have been established by an Associate command. As a result, data that should be encrypted during an I/O write operation is not encrypted, or encrypted data stored on a storage device is not decrypted during an I/O read operation. The failure to encrypt when necessary can create a data security issue, and the failure to decrypt when necessary is effectively equivalent to corrupting the data—a block of encrypted data is erroneously interpreted as unencrypted data, which could cause a variety of problems in the computer system.

Analogous problems can occur in the case of a replicating or remapping IL 76 (such as the virtualization module 80 performing mirroring or performing LBA remapping without mirroring). In the case of replication, a mirrored write will not be encrypted when it should be, presenting both a data security issue as well as a data corruption issue if the non-encrypted volume should become the primary volume. In the case of LBA remapping, encryption and decryption are applied to the wrong blocks. This can create a data security issue, and it could also cause data corruption (for instance, if the remapping is to a different device that doesn't have the association).

In order to address the potential for such problems, a detection mechanism is used to confirm the presence of one or more ILs 76 that must be present and cooperating, i.e., capable of communicating and operating according to the DEK management protocol. Whether a given IL 76 must be present in a particular system depends on the functionality specified for the system. For example, if the system is to provide one or more functions of the type that affect how a storage device 40 is accessed (e.g., a remapping, replicating or multipathing function), then it is required that a corresponding IL(s) 76 of the necessary type be present (so as to provide the function). If the system is to also support data encryption using the encryption/decryption provided by an EHBA 156 where possible, then such IL(s) 76 must also be cooperating, so that Associations can be established on the EHBAs 156 using the DEK management protocol.

Figure 8A:
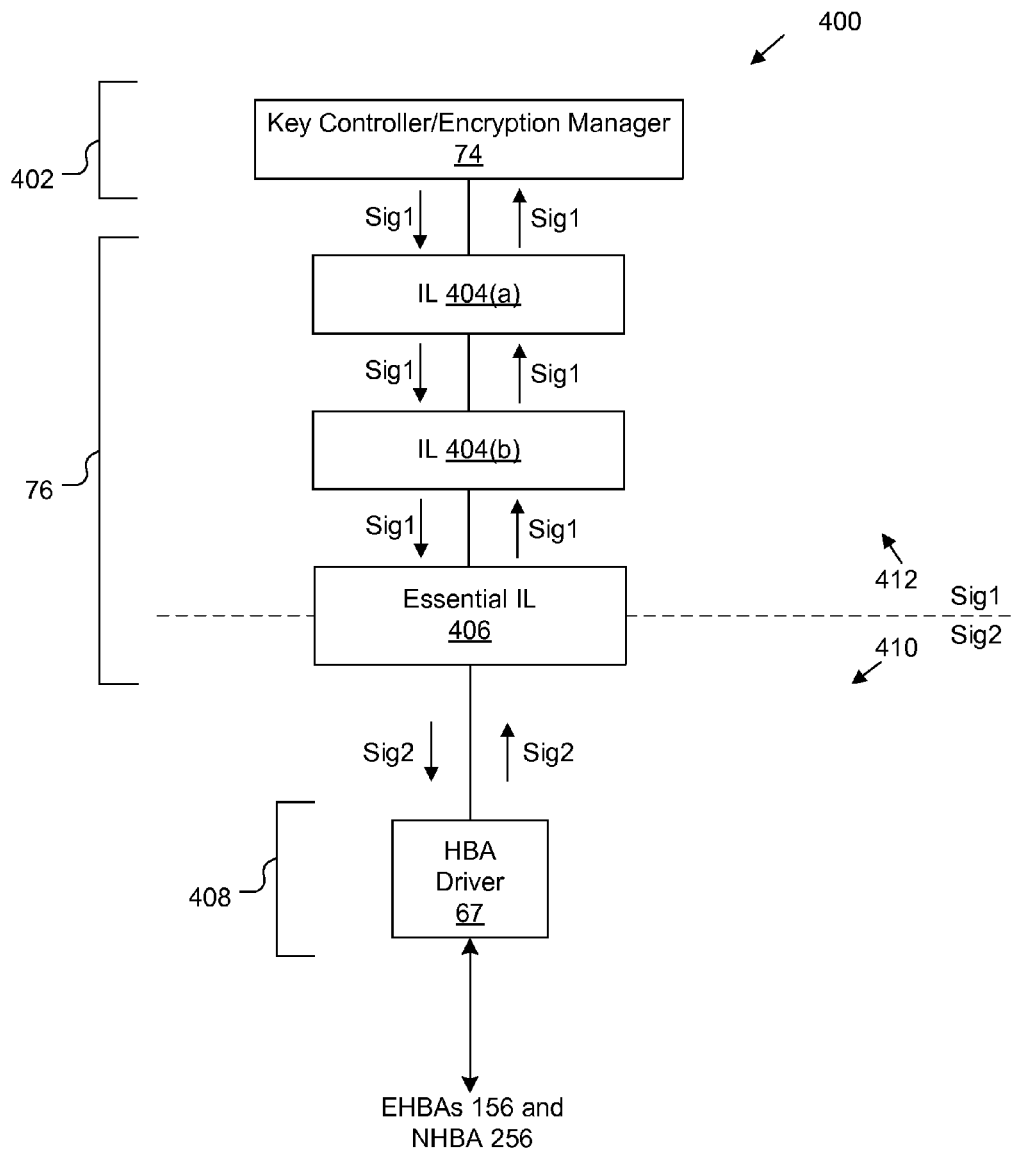
FIG. 8A depicts an example scenario according to one embodiment.

FIG. 8A shows an arrangement employing the detection mechanism. FIG. 8A depicts a storage I/O stack 400 having a number of ILs 76. As with the previous examples, the top layer 402 of the storage I/O stack 400 is the KCM/encryption manager 74. Below the KCM 74 sit several ILs 76, and at the bottom layer 408 of the storage I/O stack 400 is the HBA driver 67. As shown, ILs 76 may include ILs 404 and an "essential" IL 406. The term "essential" is used to describe an IL of the type discussed above, i.e., a layer that affects the manner of access to a storage device 40 such as a remapping, replicating or multipathing layer, and that is responsive to the DEK management protocol as described above (i.e., replicating Handshakes and Queries etc.). The other ILs 404 could either be non-essential ILs, or essential ILs that don't participate in the detection mechanism (and are perhaps detected by other means). In the description below, it is assumed that the ILs 404 participate in the DEK management protocol, although this is not required.

The vertical arrows in FIG. 8A represent a Handshake command and its response traveling down and up the I/O stack 400. As indicated by the horizontal dotted line through IL 406, a first protocol signature value Sig1 is used for the Handshake commands and responses at layers above IL 406 (region 412), while a distinct second protocol signature value Sig2 is used below the IL 406 (region 410). In the illustrated example, the IL 406 is responsible for substituting one signature value for the other as it forwards a Handshake command or response.

As described above in connection with Table 2, a cooperating IL 76 receiving what appears as a transport message ascertains whether the protocol signature field contains the correct protocol signature value as a condition to interpreting the contents of the apparent transport message as a DEK protocol message. If the correct protocol signature value is present, then the contents are interpreted and acted upon. Otherwise, the transport message is processed in some other manner, and no protocol-related processing occurs. In the case of the SCSI Read transport, for example, the received message may be processed as an ordinary SCSI Read command.

In the arrangement of FIG. 8A, the ILs 404(*a*), 404(*b*) and the upward-facing part of essential IL 406 utilize the first protocol signature value Sig1. Sig1 is included in the protocol signature field of commands and responses created by a layer, and the layer requires Sig1 to be present in the protocol signature field to recognize and act on commands and responses received by the layer. It is the same for the lower layer 408 and the downward-facing part of essential IL 406, except that Sig2 is used rather than Sig1. In particular, it is emphasized that the HBA driver 67 expects to see Sig2 in an incoming Handshake command, while the KCM 74 includes the distinct value Sig1 in the Handshake commands that it sends down the I/O stack.

In operation, the KCM 74 creates a Handshake command which is passed down through the layers 76 via a transport message (e.g., special SCSI Read). Each IL 404 confirms the presence of Sig1 on an incoming Handshake command from higher in the stack 400, and includes Sig1 in an outgoing Handshake command sent further down the stack 400. The essential IL 406 checks for Sig1 on an incoming Handshake command, but includes Sig2 in an outgoing Handshake command. This will satisfy the check by the HBA driver 67 for Sig2, so the HBA driver 67 recognizes and processes the Handshake command.

Assuming the Handshake command is directed toward an EHBA 156, the HBA driver 67 generates a Handshake response and directs it up the stack toward the KCM 74, including the value Sig2 in the protocol signature field. This satisfies the check at essential IL 406 for Sig2 on the incoming response. The essential IL 406 substitutes Sig1 for Sig2 in the protocol signature field and then passes the transport response with Handshake response along. The response travels up the rest of the stack 400 and is successfully recognized by the KCM 74, based on the presence of Sig1 in the protocol signature field. Having received the Handshake response, the KCM 74 concludes that an encryption endpoint (EHBA 156) is present on the path to the target device, and that the essential IL 406 is present. The KCM 74 can then reliably engage in additional DEK management protocol operations (Query, Associate) to establish the necessary Associations on the data path to the corresponding storage device. It will be appreciated that this description is somewhat simplified, because in some cases the essential IL 406 will be replicating Handshake commands and performing logic on Handshake responses before returning a Handshake response to the KCM 74. However, this description illustrates the operation of the detection mechanism that employs multiple distinct signatures.

In the arrangement of FIG. 8A, the ILs 404 could be non-cooperating layers that do not participate in the DEK management protocol. In that case, the ILs 404 simply forward protocol commands and responses up and down the stack 400 without examining the protocol signature value. The operation of the detection mechanism is essentially the same—the substitution performed by essential IL 406 enables the KCM 74 to confirm its presence.

Figure 8B:
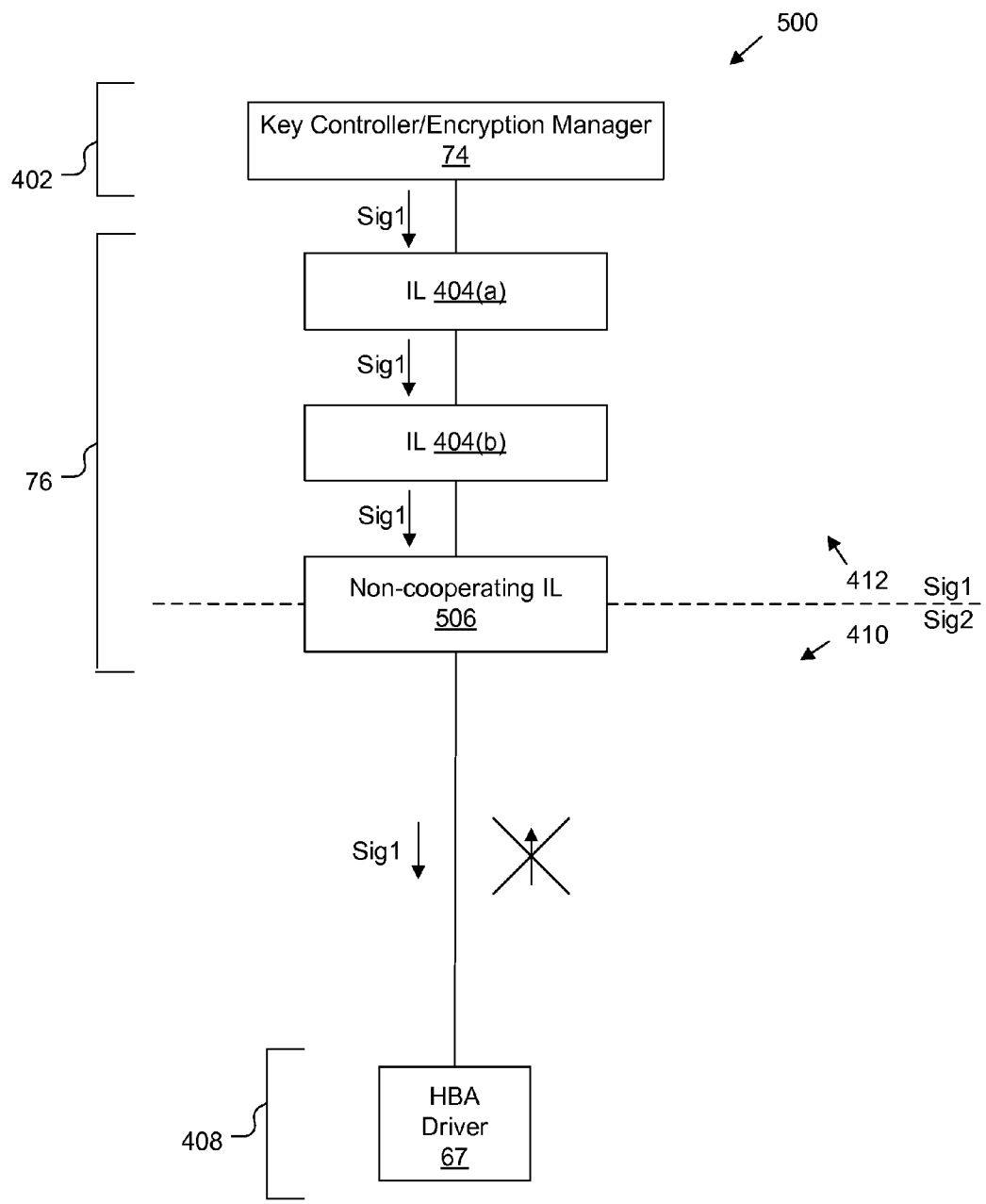
FIG. 8B depicts an example scenario according to another embodiment.

FIG. 8B is used to describe how a problematic configuration is detected using the above-described mechanism. FIG. 8B shows a similar storage I/O stack 500, except that it has a non-cooperating IL 506 in place of the essential IL 406 of FIG. 8A. The non-cooperating IL 506 does not recognize or act on the DEK management commands, and specifically is incapable of substituting one protocol signature value for another—it merely passes received commands and responses along without alteration. Thus, assuming the same use of the signature value Sig1 at the upper layers, an incoming Handshake command received by HBA driver 67 will have the signature value Sig1 instead of Sig2, and therefore the command will not be recognized by the HBA driver 67 (which examines incoming transport messages for the presence of Sig2 before interpreting their contents as a Handshake command). In this case, the HBA driver 67 does not generate a Handshake response, because it has not recognized any incoming Handshake command which requires such a response. The KCM 74 detects the non-response (described below) and concludes that there is no proper support for encryption on the path to the respective storage device, and thus makes no attempt to create an encryption Association on an EHBA 156 for the target storage device. The presence of the non-cooperating layer 506 prevents the use of EHBA encryption for the target storage device by preventing the HBA driver 67 from recognizing and responding to a received Handshake command.

The KCM 74 might detect the non-response to a Handshake in a variety of ways. It is expected that the most likely method will be that there is a response at the transport level but the transport response does not include the proper protocol information (e.g., protocol signature) within it. In the case of the SCSI Read transport, for example, the read returns but the protocol message in the read buffer has been overwritten by the contents of the storage device at the address of the read command.

In the scenario of FIG. 8B, the HBA driver 67 does not find Sig2 in the protocol signature field and thus treats the transport message (for instance, a SCSI Read command) as a normal SCSI message (for instance a read) instead of as a protocol transport message carrying a Handshake command. The SCSI command is forwarded on toward the target toward the target storage device 40 for execution. In the case where a SCSI Read is used for the transport, assuming successful completion of the read, the read buffer that contains the Handshake command will become filled with whatever data is stored at the addressed location (e.g., LBA 1009) of the target storage device, which in general will not resemble a valid Handshake response. As the read response is signaled to the layers going up the stack to the KCM 74, each layer fails to find a valid protocol signature and thus takes no protocol-related action. At the KCM 74, the failure to find a valid protocol signature signifies a non-response to the Handshake command, and the KCM 76 does not proceed any further in the DEK management protocol (Query, Associate) for the target storage device.

If the SCSI Read command should not complete successfully for some reason, then the command data block portion of the SCSI Read command will be updated with an error response status signifying that the command could not be performed successfully. The KCM 74 will likewise treat this condition as a non-response to the Handshake request.

FIG. 9 provides a generalized description of a method 1200 of operation of storage I/O stacks 400, 500 or other sets of functional components along a data path to a storage device.

At step 1210, first and second functional components engage in an in-band communications protocol which employs protocol commands and responses carried along the data path as contents of in-band transport messages and responses. As an example, the KCM 74 and HBA driver 67 may operate as the functional components, and the in-band communications protocol can be the DEK management protocol as described above. The protocol commands and responses include a handshake command and a handshake response used during an initial handshake operation. Each protocol command and response has a respective protocol signature field carrying one of distinct first and second signature values used to identify the presence of the protocol command or response in the transport messages and responses at different locations along the data path.

Step 1220 is performed by the first functional component during the handshake operation. The first signature value is included in the protocol signature field of an outgoing handshake command being sent on the data path in a transport message. Also, in response to receiving a transport response from the data path, it is confirmed that the first signature value is found at an expected location of the protocol signature field as a condition to interpreting the contents of the transport response as an incoming handshake response.

Step 1230 is performed by the second functional component during the handshake operation. In response to receiving the transport message from the data path, it is confirmed that the second signature value is found at an expected location of the protocol signature field as a condition to interpreting the contents of the transport message as an incoming handshake command. The second signature value is also included in the protocol signature field of an outgoing handshake response being sent on the data path in the transport response.

By the above operation, the first functional component (e.g., KCM 74) will be able to determine whether two conditions are satisfied in order to proceed with further protocol operations, such as attempting to configure an encryption endpoint. The two conditions include the presence of the second functional component (primary function of Handshake), and the presence of a necessary intermediate functional component as indicated by its ability to swap the first and second signatures as described above. If the first functional component receives and recognizes the handshake response, then both conditions are satisfied and further protocol operations can proceed. An example of this outcome is shown at 1260, where the KCM 74 concludes that an EE (e.g., an EHBA 156) is present at the bottom of a properly configured storage I/O stack 400 and proceeds to subsequent protocol operations (e.g., using the Query and Associate commands) as described above in connection with FIGS. 1-8. If either of these conditions is not satisfied, then the first functional component will not receive a handshake response. An example of this outcome is shown at 1270, where the KCM 74 concludes that the storage I/O stack 400, 500 is either improperly configured or does not have an EE. Therefore, KCM 74 does not proceed with subsequent protocol operations for that particular device.

Figure 10:
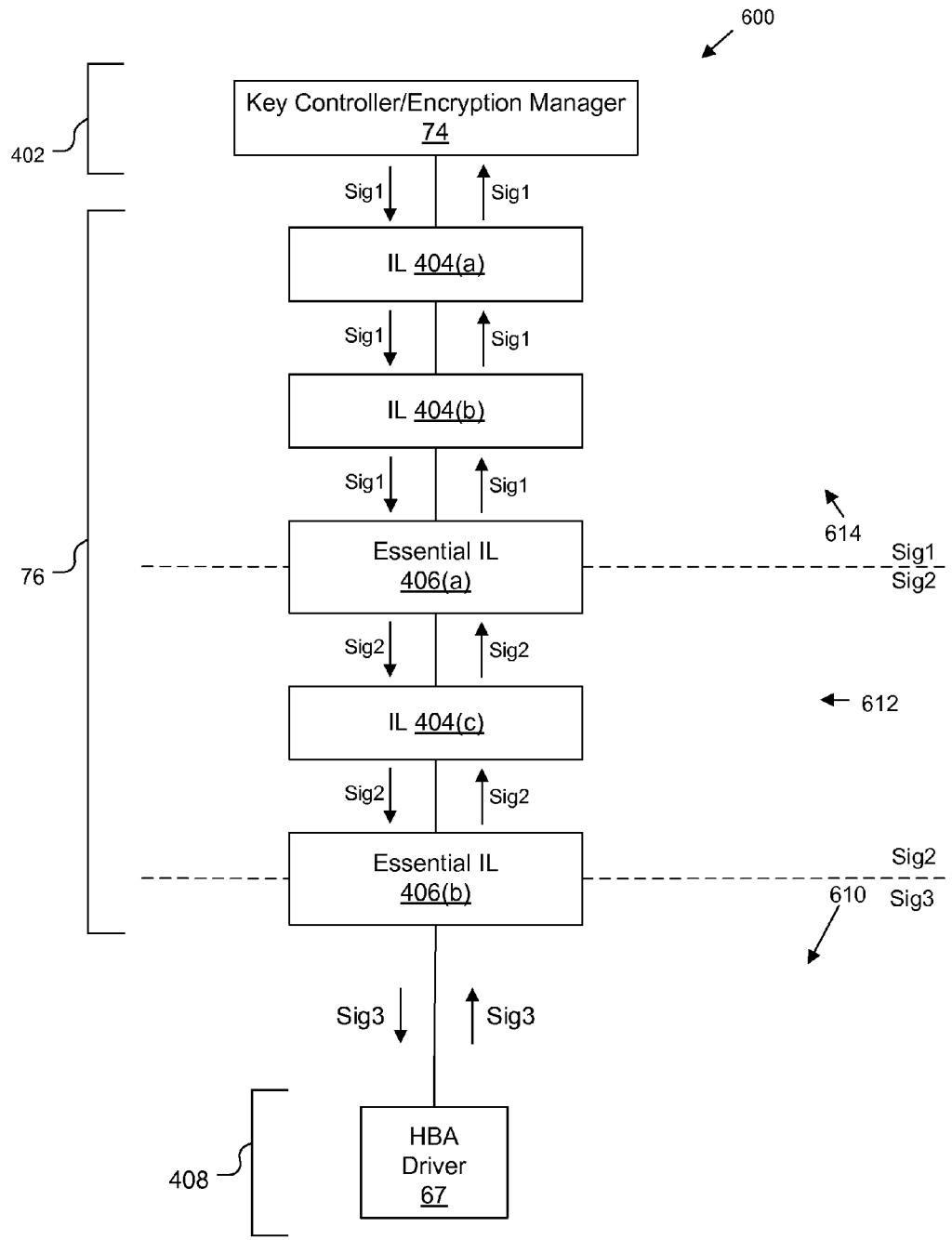
FIG. 10 depicts an example scenario according to one embodiment.

FIG. 10 illustrates how the method 1200 can also be used in the case of a more complex storage I/O stack 66. An example storage I/O stack 600 is similar to storage I/O stacks 400, 500, except that additional ILs 76 are present. In particular, a third nonessential IL 404(c) and a second essential IL 406(b) are present. In this case, protocol signature value Sig2 is used in the region 612 between ILs 406(a) and 406(b), and the value Sig3 is used in the region 610 between IL 406(b) and the HBA driver 67. Operation is as described above, with two substitutions occurring as a protocol command or response travels up or down the stack 600. Using this arrangement, the KCM 74 is able to confirm that the two essential ILs 406(a), 406(b) are present in the storage I/O stack 600.

In some embodiments, a given layer 402, 76 or 408 may be hardwired or hard-coded to always expect to receive a given protocol signature value, yet it is necessary to support the possibility of multiple system configurations that may use different sets of signature values. For example, if bottom layer 408 is hardwired to expect Sig2, then it can work in an arrangement like that of FIG. 8A, but it should also work in an arrangement similar to FIG. 10 which uses three signature values. In such an arrangement, protocol signature value Sig3 may be used in the region 612 between ILs 406(a) and 406(b), and the value Sig2 used in the region 610 between ILs 406(b) and the HBA driver 67. This kind of flexible allocation of signature values among regions of the I/O stack may be necessary to achieve ensured compatibility with layers or functional components supplied by a third party, for example.

In some embodiments, the various layers 402, 76, 408 may be configured to expect particular protocol signature values based on a pre-established list of valid protocol signature values. For example, the list may be a series [Sig3, Sig2, Sig1, Sig0]. If a storage I/O stack 400, 500 is to include only one essential IL 406, then the first two values Sig3, Sig2 may be used, with Sig3 used below the IL 406 in region 410 and Sig2 used above the IL 406 in region 412. If a storage I/O stack 600 is to include two essential ILs 406(a), 406(b), then the first three values Sig3, Sig2, Sig1 may be used, with Sig3 used below the IL 406(b) in region 610, Sig2 used between ILs 406(a) and 406(b) in region 612, and Sig1 used above IL 406(a) in region 614.

An example list of [Sig3, Sig2, Sig1, Sig0] is depicted in Table 4:

TABLE 4

Example valid Protocol Signature List

| Pre-established list of valid protocol signatures | Example values |
|---|---|
| Sig3 | 0x0a, 0x0b, 0x0c, 0x0d, 0x0e, 0x0f, 0x10, 0x11 |
| Sig2 | 0x0b, 0x0b, 0x0c, 0x0d, 0x0e, 0x0f, 0x10, 0x11 |
| Sig1 | 0x0c, 0x0b, 0x0c, 0x0d, 0x0e, 0x0f, 0x10, 0x11 |
| Sig0 | 0x0d, 0x0b, 0x0c, 0x0d, 0x0e, 0x0f, 0x10, 0x11 |

In some embodiments, a system administrator may configure the KCM 74 and the various ILs 76 to use protocol signatures according to the expected number of essential ILs and their position within the storage I/O stack 66. In some embodiments, all bottom layers 408 are pre-configured to use protocol signature Sig3, but, in other embodiments, the protocol signature expected at the bottom layer 408 is also configurable.

While various embodiments of the invention have been particularly shown and described, it will be understood by those skilled in the art that various changes in form and details may be made therein without departing from the spirit and scope of the invention as defined by the appended claims.

Although method 1200 has been illustrated using various example configurations 400, 500, 600 of a storage I/O stack 66, other configurations may also be used in conjunction with method 1200. Thus, for example, storage I/O stack may contain p essential ILs 406 and q nonessential ILs 404, where p is any integer greater than or equal to 0, and q is any integer greater than or equal to 0. Similarly, although a pre-established list of valid protocol signature values has been described as containing 4 elements, it may contain any number of elements such as 10 or 100.

The description above includes particular examples of a handshake operation and handshake commands and responses, but equivalent operations and commands/responses can take other forms. One important characteristic of a handshake operation is its use by one component (e.g., KCM 74) to test for the existence of another component (e.g., a cooperating EE in the storage I/O stack 66). Other operations, commands and responses described herein may also be realized in forms other than the specific examples described herein.

It should be noted that the detection mechanism described herein need not be exclusive of other detection mechanisms that might also be utilized in a system. While one or more essential layers are detected using the disclosed technique, another layer or layers that might need to be present and protocol-capable in a given system may be detectable by some other detection mechanism.

The detection mechanism is described above primarily in use within a driver stack that resides on a single host computer 36. However, it can also be used between a host computer and a separate hardware storage processing device such as the external intermediate device 42 of FIG. 1. In such a case, the second functional component referred in the process of FIG. 9 may reside on the external intermediate device 42, and an essential layer to be detected may be located in either the host computer 36 or the external intermediate device 42. It should be noted that in this case the data path to the target storage device of a protocol command includes the path through the external intermediate device 42 and tunnel 44 to the remote storage device 46.

In the case of use between a host computer and a separate hardware storage processing device, it may be desirable to employ an alternative transport mechanism that does not rely on use of a read buffer of a storage read command. One such alternative may be to employ the SCSI Mode Sense for an "unsupported page as a probe or handshake mechanism detect the presence of the off-host second functional component. There is also a predefined SCSI Vendor-Specific Command that can be used as the transport to carry protocol commands and responses. The data buffer attached to the SCSI command may be used bi-directionally for protocol data. As an alternative command/response transport, a SCSI Mode Select Command may be used.

Also, although various embodiments have been described as methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of operating a data processing system having a host computer coupled to a storage device by functional components along a data path, comprising:

engaging in an in-band communications protocol between first and second ones of the functional components, the in-band communications protocol employing protocol commands and responses carried along the data path as contents of in-band transport messages and responses, the protocol commands and responses including a handshake command and a handshake response used during an initial handshake operation, each protocol command and response having a respective protocol signature field carrying one of distinct first and second signature values used to identify the presence of the protocol command or response in the transport messages and responses at different locations along the data path;

at the first functional component during the handshake operation, (1) including the first signature value in the protocol signature field of an outgoing handshake command being sent on the data path in a transport message, and (2) in response to receiving a transport response from the data path, confirming that the first signature value is found at an expected location of the protocol signature field as a condition to interpreting the contents of the transport response as an incoming handshake response; and at the second functional component during the handshake operation, (1) in response to receiving the transport message from the data path, confirming that the second signature value is found at an expected location of the protocol signature field as a condition to interpreting the contents of the transport message as an incoming handshake command, and (2) including the second signature value in the protocol signature field of an outgoing handshake response being sent on the data path in the transport response;

wherein the data processing system further includes an intermediate functional component on the data path between the first and second functional components, the intermediate functional component performing one or more of remapping, replication and multipathing functions affecting a manner of access to the storage device via the data path, the intermediate functional component being operative (1) to perform layer-specific logic during a subsequent operation of the in-band communications protocol, and (2) during the handshake operation, to substitute the second signature value for the first signature value in the handshake command of the transport message and to substitute the first signature value for the second signature value in the handshake response of the transport response.

2. A method according to claim 1, wherein the first and second functional components are components of a storage input/output (I/O) driver stack on the host computer.

3. A method according to claim 2, wherein the host computer includes the intermediate functional component between the first and second functional components.

4. A method according to claim 3, wherein the host computer further includes one or more additional intermediate functional components between the first and second functional components, each additional intermediate functional component doing no substitution of signature values in handshake commands or responses of transport messages and responses traversing the additional intermediate functional component.

5. A method according to claim 1, wherein the data processing system includes an intermediate device external to the host computer along the data path, and wherein the second functional component is a functional component of the external intermediate device.

6. A method according to claim 5, wherein the data processing system further includes one or more additional intermediate functional components on the data path between the first and second functional components, each additional intermediate functional component doing no substitution of signature values in handshake commands or responses of transport messages and responses traversing the additional intermediate functional component.

7. A method according to claim 1, wherein the storage device is located remotely from the host computer; and wherein at least a portion of the data path includes a wide area network tunnel.

8. A method of operating a data processing system having a host computer coupled to a storage device by functional components along a data path, comprising:

engaging in an in-band communications protocol between first and second ones of the functional components, the in-band communications protocol employing protocol commands and responses carried along the data path as contents of in-band transport messages and responses, the protocol commands and responses including a handshake command and a handshake response used during an initial handshake operation, each protocol command and response having a respective protocol signature field carrying one of distinct first and second signature values used to identify the presence of the protocol command or response in the transport messages and responses at different locations along the data path;

at the first functional component during the handshake operation, (1) including the first signature value in the protocol signature field of an outgoing handshake command being sent on the data path in a transport message, and (2) in response to receiving a transport response from the data path, confirming that the first signature value is found at an expected location of the protocol signature field as a condition to interpreting the contents of the transport response as an incoming handshake response; and at the second functional component during the handshake operation, (1) in response to receiving the transport message from the data path, confirming that the second signature value is found at an expected location of the protocol signature field as a condition to interpreting the contents of the transport message as an incoming handshake command, and (2) including the second signature value in the protocol signature field of an outgoing handshake response being sent on the data path in the transport response;

wherein the first and second functional components are components of a storage input/output (I/O) driver stack on the host computer; and wherein the in-band communications protocol is a data encryption key (DEK) management protocol used to detect the presence and capabilities of an encryption endpoint and to establish encryption associations in the encryption endpoint, and wherein the first functional component is a key controller module responsible for managing encryption and decryption of data of the storage device, and the second functional component is a host bus adapter (HBA) driver for an encrypting host bus adapter coupling the host computer to a storage interconnection bus of the data path, the encrypting host bus adapter being capable of performing hardware-assisted encryption and decryption of data of storage I/O commands directed at the storage device.

9. A method according to claim 8, wherein the host computer further includes an intermediate-layer driver between the key controller module and the HBA driver, the intermediate-layer driver performing one or more of remapping, replication and multipathing functions affecting a manner of access to the storage device via the data path, the intermediate-layer driver being operative (1) to perform layer-specific logic during a subsequent operation of the DEK management protocol, and (2) during the handshake operation, to substitute the second signature value for the first signature value in the handshake command of the transport message and to substitute the first signature value for the second signature value in the handshake response of the transport response.

10. A method according to claim 9, wherein the host computer further includes one or more additional intermediate-layer drivers between the key controller module and the HBA driver, each additional intermediate-layer driver doing no substitution of signature values in handshake commands or responses of transport messages and responses traversing the additional intermediate-layer driver.

11. A method of operating a data processing system having a host computer coupled to a storage device by functional components along a data path, comprising:
   engaging in an in-band communications protocol between first and second ones of the functional components, the in-band communications protocol employing protocol commands and responses carried along the data path as contents of in-band transport messages and responses, the protocol commands and responses including a handshake command and a handshake response used during an initial handshake operation, each protocol command and response having a respective protocol signature field carrying one of distinct first and second signature values used to identify the presence of the protocol command or response in the transport messages and responses at different locations along the data path;
   at the first functional component during the handshake operation, (1) including the first signature value in the protocol signature field of an outgoing handshake command being sent on the data path in a transport message, and (2) in response to receiving a transport response from the data path, confirming that the first signature value is found at an expected location of the protocol signature field as a condition to interpreting the contents of the transport response as an incoming handshake response; and
   at the second functional component during the handshake operation, (1) in response to receiving the transport message from the data path, confirming that the second signature value is found at an expected location of the protocol signature field as a condition to interpreting the contents of the transport message as an incoming handshake command, and (2) including the second signature value in the protocol signature field of an outgoing handshake response being sent on the data path in the transport response;
   wherein the first and second functional components are components of a storage input/output (I/O) driver stack on the host computer; and
   wherein the first and second signature values are top and bottom ones of an ordered sequence of signature values used along the data path, and wherein the data processing system further includes one or more intermediate functional components on the data path between the first and second functional components, each intermediate functional component performing one or more of remapping, replication and multipathing functions affecting a manner of access to the storage device via the data path, each intermediate functional component being operative (1) to perform layer-specific logic during a subsequent operation of the in-band communications protocol, and (2) during the handshake operation, to substitute a respective lower-ordered one of the signature values for a respective higher-ordered one of the signature values in the handshake command of the transport message and to substitute the respective higher-ordered one of the signature values for the respective lower-ordered one of the signature values in the handshake response of the transport response.

12. A data processing system, comprising:
   a host computer; and
   a storage device coupled to the host computer by functional components along a data path;
   wherein first and second ones of the functional components are operative to engage in an in-band communications protocol, the in-band communications protocol employing protocol commands and responses carried along the data path as contents of in-band transport messages and responses, the protocol commands and responses including a handshake command and a handshake response used during an initial handshake operation, each protocol command and response having a respective protocol signature field carrying one of distinct first and second signature values used to identify the presence of the protocol command or response in the transport messages and responses at different locations along the data path;
   the first functional component is operative during the handshake operation, (1) to include the first signature value in the protocol signature field of an outgoing handshake command being sent on the data path in a transport message, and (2) in response to receiving a transport response from the data path, to confirm that the first signature value is found at an expected location of the protocol signature field as a condition to interpreting the contents of the transport response as an incoming handshake response; and
   the second functional component is operative during the handshake operation (1) in response to receiving the transport message from the data path, to confirm that the second signature value is found at an expected location of the protocol signature field as a condition to interpreting the contents of the transport message as an incoming handshake command, and (2) to include the second signature value in the protocol signature field of an outgoing handshake response being sent on the data path in the transport response;
   wherein the data processing system further includes an intermediate functional component on the data path between the first and second functional components, the intermediate functional component performing one or more of remapping, replication and multipathing functions affecting a manner of access to the storage device via the data path, the intermediate functional component being operative (1) to perform layer-specific logic during a subsequent operation of the in-band communications protocol, and (2) during the handshake operation, to substitute the second signature value for the first signature value in the handshake command of the transport message and to substitute the first signature value for the second signature value in the handshake response of the transport response.

13. A data processing system according to claim 12, wherein the first and second functional components are components of a storage input/output (I/O) driver stack on the host computer.

14. A data processing system according to claim 13, wherein the host computer includes the intermediate functional component between the first and second functional components.

15. A data processing system according to claim 14, wherein the host computer further includes one or more additional intermediate functional components between the first and second functional components, each additional intermediate functional component doing no substitution of signature values in handshake commands or responses of transport messages and responses traversing the additional intermediate functional component.

16. A data processing system according to claim 12, wherein the data processing system includes an intermediate device external to the host computer along the data path, and wherein the second functional component is a functional component of the external intermediate device.

17. A data processing system according to claim 16, wherein the data processing system further includes one or more additional intermediate functional components on the data path between the first and second functional components, each additional intermediate functional component doing no substitution of signature values in handshake commands or responses of transport messages and responses traversing the additional intermediate functional component.

18. A data processing system according to claim 12, wherein the storage device is located remotely from the host computer; and wherein at least a portion of the data path includes a wide area network tunnel.

19. A data processing system, comprising:
a host computer; and
a storage device coupled to the host computer by functional components along a data path;
wherein first and second ones of the functional components are operative to engage in an in-band communications protocol, the in-band communications protocol employing protocol commands and responses carried along the data path as contents of in-band transport messages and responses, the protocol commands and responses including a handshake command and a handshake response used during an initial handshake operation, each protocol command and response having a respective protocol signature field carrying one of distinct first and second signature values used to identify the presence of the protocol command or response in the transport messages and responses at different locations along the data path;
wherein the first functional component is operative during the handshake operation, (1) to include the first signature value in the protocol signature field of an outgoing handshake command being sent on the data path in a transport message, and (2) in response to receiving a transport response from the data path, to confirm that the first signature value is found at an expected location of the protocol signature field as a condition to interpreting the contents of the transport response as an incoming handshake response; and
wherein the second functional component is operative during the handshake operation (1) in response to receiving the transport message from the data path, to confirm that the second signature value is found at an expected location of the protocol signature field as a condition to interpreting the contents of the transport message as an incoming handshake command, and (2) to include the second signature value in the protocol signature field of an outgoing handshake response being sent on the data path in the transport response;
wherein the first and second functional components are components of a storage input/output (I/O) driver stack on the host computer; and
wherein the in-band communications protocol is a data encryption key (DEK) management protocol used to detect the presence and capabilities of an encryption endpoint and to establish encryption associations in the encryption endpoint, and wherein the first functional component is a key controller module responsible for managing encryption and decryption of data of the storage device, and the second functional component is a host bus adapter (HBA) driver for an encrypting host bus adapter coupling the host computer to a storage interconnection bus of the data path, the encrypting host bus adapter being capable of performing hardware-assisted encryption and decryption of data of storage I/O commands directed at the storage device.

20. A data processing system according to claim 19, wherein the host computer further includes an intermediate-layer driver between the key controller module and the HBA driver, the intermediate-layer driver performing one or more of remapping, replication and multipathing functions affecting a manner of access to the storage device via the data path, the intermediate-layer driver being operative (1) to perform layer-specific logic during a subsequent operation of the DEK management protocol, and (2) during the handshake operation, to substitute the second signature value for the first signature value in the handshake command of the transport message and to substitute the first signature value for the second signature value in the handshake response of the transport response.

21. A data processing system according to claim 20, wherein the host computer further includes one or more additional intermediate-layer drivers between the key controller module and the HBA driver, each additional intermediate-layer driver doing no substitution of signature values in handshake commands or responses of transport messages and responses traversing the additional intermediate-layer driver.

22. A data processing system, comprising:
a host computer; and
a storage device coupled to the host computer by functional components along a data path;
wherein first and second ones of the functional components are operative to engage in an in-band communications protocol, the in-band communications protocol employing protocol commands and responses carried along the data path as contents of in-band transport messages and responses, the protocol commands and responses including a handshake command and a handshake response used during an initial handshake operation, each protocol command and response having a respective protocol signature field carrying one of distinct first and second signature values used to identify the presence of the protocol command or response in the transport messages and responses at different locations along the data path;
wherein the first functional component is operative during the handshake operation, (1) to include the first signature value in the protocol signature field of an outgoing handshake command being sent on the data path in a transport message, and (2) in response to receiving a transport response from the data path, to confirm that the first signature value is found at an expected location of the protocol signature field as a condition to interpreting the contents of the transport response as an incoming handshake response; and
wherein the second functional component is operative during the handshake operation (1) in response to receiving the transport message from the data path, to confirm that the second signature value is found at an expected location of the protocol signature field as a condition to interpreting the contents of the transport message as an incoming handshake command, and (2) to include the second signature value in the protocol signature field of an outgoing handshake response being sent on the data path in the transport response;

wherein the first and second functional components are components of a storage input/output (I/O) driver stack on the host computer; and wherein the first and second signature values are top and bottom ones of an ordered sequence of signature values used along the data path, and wherein the data processing system further includes one or more intermediate functional components on the data path between the first and second functional components, each intermediate functional component performing one or more of remapping, replication and multipathing functions affecting a manner of access to the storage device via the data path, each intermediate functional component being operative (1) to perform layer-specific logic during a subsequent operation of the in-band communications protocol, and (2) during the handshake operation, to substitute a respective lower-ordered one of the signature values for a respective higher-ordered one of the signature values in the handshake command of the transport message and to substitute the respective higher-ordered one of the signature values for the respective lower-ordered one of the signature values in the handshake response of the transport response.

* * * * *